United States Patent
Archer et al.

(10) Patent No.: US 9,324,066 B2
(45) Date of Patent: Apr. 26, 2016

(54) METHOD AND SYSTEM FOR PROVIDING VIRTUAL CREDIT CARD SERVICES

(75) Inventors: Steven T. Archer, Dallas, TX (US); Robert A. Clavenna, Lucas, TX (US); Kristopher A. Pate, Sachse, TX (US); Paul Hubner, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 590 days.

(21) Appl. No.: 12/643,424

(22) Filed: Dec. 21, 2009

(65) Prior Publication Data

US 2011/0153437 A1 Jun. 23, 2011

(51) Int. Cl.
*G06Q 20/00* (2012.01)
*G06Q 40/00* (2012.01)
*G06Q 20/32* (2012.01)
*G06Q 20/10* (2012.01)
*G06Q 20/20* (2012.01)
*G06Q 20/34* (2012.01)
*G06Q 20/38* (2012.01)

(52) U.S. Cl.
CPC ............ *G06Q 20/32* (2013.01); *G06Q 20/10* (2013.01); *G06Q 20/20* (2013.01); *G06Q 20/204* (2013.01); *G06Q 20/325* (2013.01); *G06Q 20/3224* (2013.01); *G06Q 20/3227* (2013.01); *G06Q 20/3278* (2013.01); *G06Q 20/351* (2013.01); *G06Q 20/385* (2013.01)

(58) Field of Classification Search
None
See application file for complete search history.

(56) References Cited

U.S. PATENT DOCUMENTS

| | | | |
|---|---|---|---|
| 7,693,752 B2 * | 4/2010 | Jaramillo | 705/26.9 |
| 7,908,216 B1 * | 3/2011 | Davis | G06Q 20/02 705/41 |
| 7,922,082 B2 * | 4/2011 | Muscato | G06Q 20/10 235/380 |
| 8,046,268 B2 * | 10/2011 | Hunt | G06Q 20/102 705/26.1 |
| 2003/0101131 A1 * | 5/2003 | Warren et al. | 705/38 |
| 2004/0139004 A1 * | 7/2004 | Cohen et al. | 705/39 |
| 2005/0033609 A1 * | 2/2005 | Yang | G06Q 10/10 705/2 |
| 2007/0055630 A1 * | 3/2007 | Gauthier et al. | 705/44 |
| 2007/0288313 A1 * | 12/2007 | Brodson et al. | 705/14 |
| 2010/0048247 A1 * | 2/2010 | Markison | 455/558 |
| 2010/0082487 A1 * | 4/2010 | Nelsen | 705/44 |
| 2010/0125509 A1 * | 5/2010 | Kranzley et al. | 705/17 |

* cited by examiner

Primary Examiner — Ariel Yu

(57) ABSTRACT

An approach is provided for virtual credit card services. A request for a limited use transactional account number representing a virtual credit card is generated at a mobile device. The limited use transactional account number is received in response to the request. A point of sale interface is configured with the limited use transactional account number for presentation at a point of sale terminal.

17 Claims, 13 Drawing Sheets

METHOD AND SYSTEM FOR PROVIDING VIRTUAL CREDIT CARD SERVICES

BACKGROUND INFORMATION

Consumer adoption of mobile devices, such as cellular telephones, laptop computers, pagers, personal digital assistants, and the like, is increasing. These devices can be used for a diversity of purposes ranging from basic communications, to conducting business transactions, to managing entertainment media, and a host of other tasks. Additional enhancements, such as location-awareness features, e.g., global positioning system (GPS) tracking, also enable mobile device users to monitor their position and present their location via a local display. With such functionality available, it is now possible to expand the usefulness of these mobile devices into yet other service arenas, such as, for example, the realm of credit card services.

Therefore, there is a need for an approach that can efficiently and effectively provide virtual credit card services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing virtual credit card services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to virtual credit card limited use transactional account numbers, it is contemplated that various exemplary embodiments are applicable to other or equivalent virtual transactional accounts and associated limited use transactional account numbers.

Figure 1:
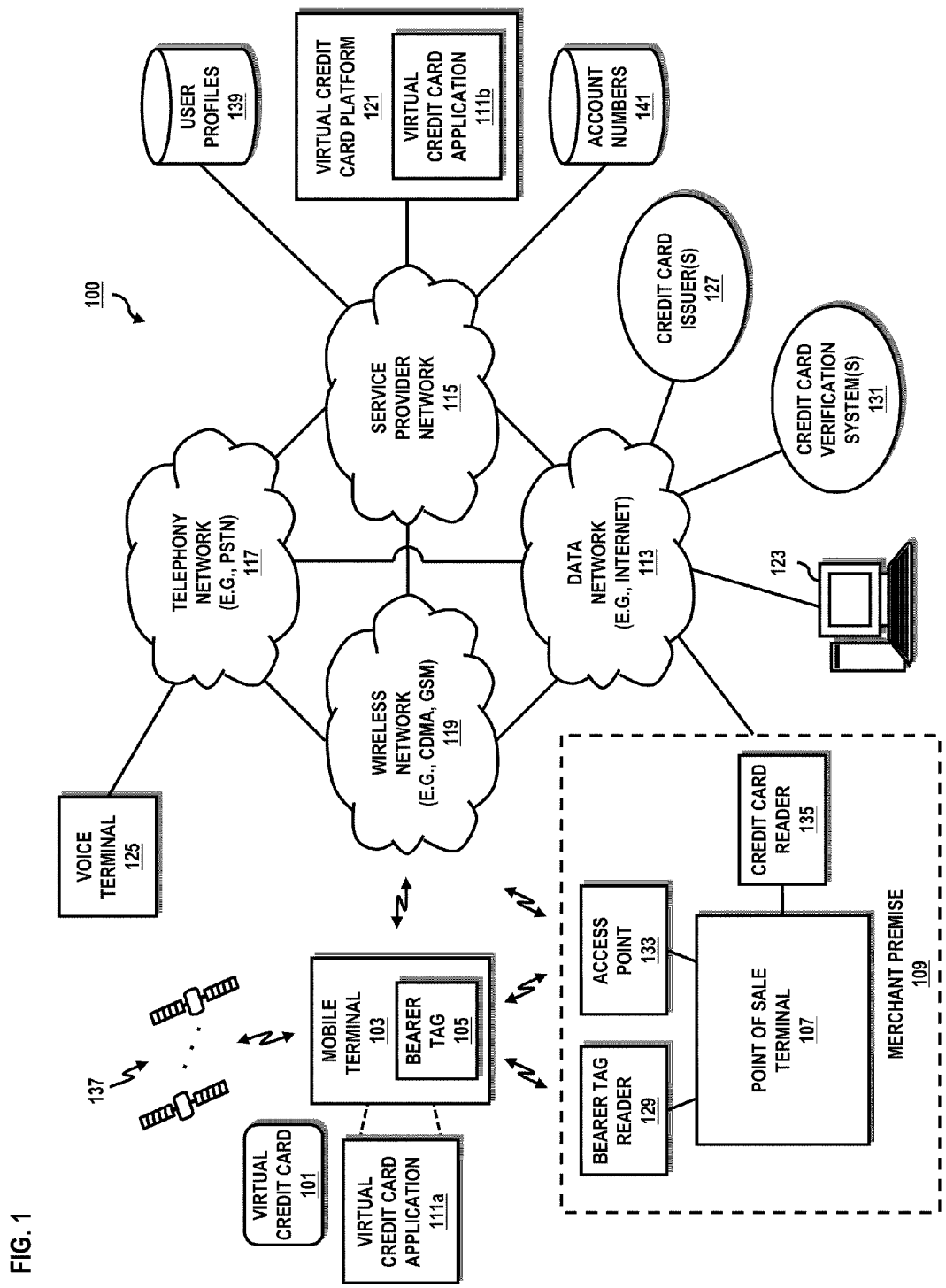
FIG. 1 is a diagram of a system configured to provide virtual credit card services, according to an exemplary embodiment.

FIG. 1 is a diagram of a system configured to provide virtual credit card services, according to an exemplary embodiment. For illustrative purposes, system 100 is described with respect to a mechanism for requesting and receiving limited use transactional account numbers associated with corresponding virtual credit cards, such as virtual credit card 101, at one or more mobile devices 103. In exemplary embodiments, the limited use transactional account numbers and/or other virtual credit card information (e.g., associated billing address information, credit card type information, credit verification value, one or more expiration values, identifier of an issuing credit institution, identifier of a subscriber authorized to use the limited use transactional account numbers, etc.) may be utilized to configure one or more point of sale interfaces (such as bearer tag 105, a display (not shown) of mobile device 103, and/or virtual credit card 101) for presentation at one or more point of sale terminals, such as point of sale terminal 107 corresponding to merchant premise 109 in associated with a point of sale transaction. It is noted that the mechanism may reside locally within respective mobile devices, such as virtual credit card application 111a of mobile device 103, or alternatively (or additionally), may reside remotely over one or more networks (e.g., data network 113, service provider network 115, telephony network 117, and/or wireless network 119), such as virtual credit card application 111b of virtual credit card platform (or platform) 121. Platform 121 can be maintained and operated by a service provider. In this manner, limited use transactional account numbers and, thereby, limited use virtual credit cards, may be network-coordinated and/or coordinated by respective mobile devices 103. It is noted, however, that the virtual credit card services of system 100 may also be accessed and/or facilitated via one or more other client devices, such as computing device 123 and voice terminal 125. While specific reference will be made hereto, it is contemplated that system 100 may embody many forms and include multiple and/or alternative components and facilities.

It is recognized that credit card transactions may occur in primarily two realms, e.g., a physical realm and a virtual realm. In the physical realm, consumers have traditionally presented conventional credit cards to merchants for scanning (or otherwise reading) via conventional credit card interfaces. Information read from these conventional credit cards is, more or less, statically defined, e.g., a predefined account number, credit verification code, expiration date, monetary limit, etc. As such, this static information is subject to loss and/or theft. In fact, countless amounts of money are lost each year due to fraudulent credit card transactions. For instance, transactional account numbers associated with statically defined credit cards are often stolen, in one form or another, copied and then employed without authorization. It is also observed that in a virtual realm, credit card information need not be static and may be generated, such as, on a per transaction basis. As such, extending the dynamic features of the virtual realm to physical interfaces of credit cards is desirable, such as to eliminate or at least reduce the potential for fraudulent credit card transactions. Unfortunately, current approaches leave room for improvement.

Therefore, the approach of system 100, according to certain exemplary embodiments, stems from the recognition that supporting virtual credit cards services, whereby subscribers are enabled to dynamically request and receive limited use transactional account numbers associated with one or more virtual credit cards via one or more mobile devices, provides an effective and efficient technique to extend the dynamic features of the virtual credit card realm to the physical interfaces of credit card transactions. Namely, based on dynamically received virtual credit card information, subscribers, via suitable mobile devices, are enabled to dynamically configure one or more point of sale interfaces for presentation at a point of sale terminal in association with a point of sale transaction. Further, this virtual credit card information may also be dynamically removed from the point of sale interface after completion of the point of sale transaction. In this manner, providing the virtual credit card services of system 100 enables service providers to reduce the potential for credit card theft as the virtual credit card information may be acquired when needed and relinquished when not needed.

In exemplary embodiments, the virtual credit card services of system 100 may be facilitated utilizing one or more virtual credit card applications 111a and 111b. Namely, one or more of virtual credit card applications 111a and 111b may be employed to request and receive limited use transactional account numbers associated with virtual credit cards (such as virtual credit card 101) from, for example, platform 121. It is also noted that, according to certain embodiments, virtual credit card applications 111a and/or 111b may be employed to create, customize, and manage one or more user profiles that may be utilized in the process of applying for limited use transactional account numbers issued by, for example, one or more credit card issuers (or institutions) 127, such as one or more suitable banks, brokers, financial intuitions, or other credit extending unions. In this manner, users (or subscribers) may be presented with one or more credit options via virtual credit card applications 111a and/or 111b that users may select from. It is noted that these credit options may include various terms, conditions, and/or agreements specified by credit card issuer(s) 127 that must be accepted before credit card issuer(s) 127 would be willing to extend credit to a user in association with a request for a limited use transactional account number. For instance, the credit options may include various groupings of benefits, expiration values, fees, grace periods, interest rates, monetary limits, privacy policies, transaction limits, vendor limits, etc., which may be collectively referred to as virtual credit card member agreement information. As such, virtual credit card applications 111a and/or 111b may enable users to select a particular one of these credit options and, thereby, receive a limited use transactional account number associated with a virtual credit card 101 and, in certain instances, other associated information, such as associated billing address information, credit card type information, credit verification value, one or more expiration values, identifier of an issuing credit institution, identifier of a subscriber authorized to use the limited use transactional account number, and/or the like. As used herein, the term "virtual credit card information" may be utilized to collectively refer to a limited use transactional account number associated with (or representing) virtual credit card 101 and other information associated with the limited use transactional account number. It is noted that exemplary processes for requesting, providing, and receiving virtual credit card information are described in more detail in conjunction with FIGS. 5 and 6.

According to exemplary embodiments, virtual credit card applications 111a and/or 111b may be utilized to configure a point of sale interface with virtual credit card information received in response to a request for such information. It is noted that point of sale interfaces are presented at point of sale terminals in association with conducting point of sale transactions. As such, exemplary point of sale interfaces, according to various embodiments, include a virtual credit card, such as virtual credit card 101, including one or more configurable features, such as a conductive (or magnetic) strip (not shown) or a bearer tag (not illustrated), a bearer tag 105 of mobile device 103, and/or a display (not depicted) of mobile device 103. An exemplary virtual credit card including a conductive strip is described in more detail with FIG. 8, whereas an exemplary mobile device display configured with virtual credit card information is more fully explained in conjunction with FIG. 11. A more detailed description of a bearer tag is provided in the proceeding paragraphs.

Before providing more detail in association with bearer tags, however, it is noted that point of sale interface may be encoded with received virtual credit card information on, for example, a per transaction basis and, thereby, the virtual credit card information may be removed from these point of sale interfaces once a suitable point of sale transaction has completed. It is also contemplated that the virtual credit information may be utilized for more than one transaction and, therefore, may be governed by the expiration of one or more other expiration values, such as one or more expiration dates, times, and/or exhaustions of a predefined number of suitable transactions, and like the. An exemplary virtual credit card interface for configuring a point of sale interface, such as a conductive strip of a virtual credit card, is more fully explained with FIGS. 9 and 10. An exemplary process for configuring a point of sale interface with virtual credit card information is provided with FIG. 7, whereas an exemplary process for removing virtual credit card information from a point of sale interface is provided with FIG. 12.

As seen in FIG. 1, mobile devices 103 (according to certain exemplary embodiments) include bearer tags 105 having bearer tag identifiers respectively associated therewith. Bearer tags 105 may be any suitable contactless card, near field communication (NFC) tag, radio frequency identification (RFID) tag, etc., or any combination thereof. In this manner, bearer tag identifiers may embody, for instance, one or more codes, parameters, values, etc., that distinctly identifies one bearer tag from another and, as such, may be utilized to facilitate the virtual credit card services of system 100. It is contemplated, however, that one or more bearer tags 105 may be assigned equivalent bearer tag identifiers so that one or more mobile devices 103 may be distinctly identified by equivalent bearer tag identifiers and, thereby, by equivalent virtual credit cards. It is also contemplated that bearer tags 105 may include other information, such as user profile information, virtual credit card information, and the like.

According to one embodiment, merchant (or vendor) premises 109 may include bearer tag readers 129 for detecting, reading, or otherwise receiving bearer tag identifiers of bearer tags 105 when, for example, bearer tag 105 and, thereby, mobile device 103 comes within a certain distance (or proximity) of bearer tag reader 129. Accordingly, it is noted that communication between bearer tags 105 and bearer tag readers 129 occurs wirelessly and, as such, may not require a clear "line of sight" between the respective devices. As such, bearer tag 105 (e.g., an RFID transponder) may be, for instance, a small microchip attached to an antenna (not shown) of mobile terminal 103 or may be otherwise affixed to any other suitable component of (or within) mobile device 103. In other embodiments, bearer tags may be attached to virtual credit card 101 and/or otherwise affixed within virtual credit card 101.

It is generally noted that bearer tags 105 may be passive or active devices. Passive bearer tags are generally smaller, lighter, and less expensive than active bearer tags. As such, passive bearer tags may only be activated when within a response range of a suitable bearer tag reader 129. For instance, bearer tag reader 129 may emit a relatively low-power radio wave field that is used to power bearer tag 105 and, thereby, enable bearer tag 105 to transmit suitable information stored to the device (e.g., virtual credit card information) to bearer tag reader 129 in association with, for example, a point of sale transaction. Active bearer tags, however, may incorporate (or otherwise have access to) a power source that enables active bearer tags to actively transmit information stored to these devices, rather than reflect radio frequency signals, as in the case of passive bearer tags. In this manner, active bearer tags may afford certain additional features, such as programmable and read/write capabilities, such as for encoding bearer tag 105 with and removing virtual credit card information from bearer tag 105 as limited use transactional account numbers associated with virtual credit cards expire or otherwise become obsolete. As such, mobile device users may be permitted is store, for instance, suitable user profile and/or virtual credit card information to active bearer tags.

According to exemplary embodiments, bearer tag readers 129 contain one or more transmitters, receivers, control units, and/or antennas. As such, bearer tag readers 129 may utilize these components to energize bearer tags 105, as well as demodulate and decode returned radio signals. In certain instances, bearer tag readers 129 may include one or more interfaces for converting received radio signals into one or more forms that may be passed to other systems, such as point of sale interface 107, credit card verification systems 131, virtual credit card platform 121, and the like. For example, bearer tag readers 129 may be configured to formulate requests for transmitting credit card authentication requests to credit card verification systems 131 in order to facilitate point of sale transactions.

By way of example, contactless card, NFC, RFID, and the like, technologies are short-range wireless communication technologies that enable the exchange of data between devices over relatively short distances, e.g., the range for NFC is approximately 4 inches. It is noted, however, that RFID technologies may also be configured as a long-range wireless communication technology. In this manner, merchant premises (e.g., merchant premise 109) may include one or more bearer tag readers 129 positioned to maximize the effect of point of sale transactions via bearer tag point of sale interfaces. For instance, bearer tag readers 129 may be strategically positioned near certain products, service offerings, posters, menus, entrances, registers, exits, and the like, so that, for example, suitable virtual credit card information received by, for instance, bearer tag readers 129 may be utilized to conduct point of sale transactions relatively close to the products/services being purchased. It is also noted that bearer tag readers 129 may be spaced about merchant premise 109 in order to create an effective bearer tag reader range corresponding to a boundary of merchant premise 109, such that point of sale transactions may occur at any position within the boundary of merchant premise 109.

It is noted that merchant premise 109 may also include one or more access points 133 for exchanging information (e.g., requests, messages, virtual credit card information, credit card authorizations, etc.) over one or more of networks 113-119. In this manner, access point 133 may also be utilized much like bearer tag reader in facilitating point of sale transactions, as well as providing connectivity to merchant premise 109. Further, merchant premise 109 may include one or more conventional credit card readers 135 for reading encoded conductive (e.g., magnetic) strips associated with virtual credit cards 101. As will become more apparent in FIG. 9, conventional credit card readers 135 are configured to detect magnetic flux reversals associated with alternating changes in polarity between a plurality of magnets comprising a conductive (e.g., magnetic) strip of virtual credit card 101. Based on the configuration and, thereby, detection of these magnetic flux reversals, pattering of binary values (e.g., "1s" and "0s") may be translated into virtual credit card information encoded (or otherwise stored) to the conductive strips of virtual credit cards 101. As with the virtual credit card information read via bearer tag reader 129 and/or access point 133, conventional credit card reader 135 may provide this virtual credit card information to one or more credit card verification systems 131 for authenticating, conducting, and/or verifying credit information associated with a point of sale transaction.

Accordingly, credit card verification systems 131 are configured to enable merchants to verify that virtual credit cards 103 and, thereby, the limited use transactional account numbers associated therewith, have sufficient financial credit to cover purchases being made at point of sale terminals 107. In this manner, data obtained via credit card reader 135, bearer tag reader 129, and/or access point 133 may be provided to credit card verification systems 131 for authenticating, conducting, verifying, or otherwise facilitating point of sale transactions via virtual credit card information.

It is noted that system 100 may also include satellite positioning system (SPS) technology, such as GPS technology; however, any other suitable navigational or location determination technology may be utilized, such as advanced forward link trilateration (A-FLT), assisted-GPS (A-GPS), enhanced cellular identification (CELL-ID), wireless area network (WLAN) positioning, etc. According to exemplary embodiments, the SPS technology of system 100 may be configured to utilize a constellation 137 of satellites that transmit signals to receivers (not shown) of, for example, one or more mobile devices 103, so that the receivers may determine corresponding spatial positioning information (or locations), speeds, directions, and/or timing for mobile devices 103. As such, mobile devices 103 may be configured to report this spatial positioning information to, for instance, platform 121 to facilitate presence determinations and/or carrying out one or more of the processes described herein.

As seen in FIG. 1, service provider network 115 enables client devices 103, 123, and 125 to access the features and functions of platform 121 via one or more of networks 113, 117, and 119. Networks 113-119 may be any suitable wireline and/or wireless network. For example, telephony network 117 may include a circuit-switched network, such as the public switched telephone network (PSTN), an integrated services digital network (ISDN), a private branch exchange (PBX), or other like network. Wireless network 119 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 113-119 may be completely or partially contained within one another, or may embody one or more of the aforementioned infrastructures. For instance, service provider network 115 may embody circuit-switched and/or packet-switched networks that include facilities to provide for transport of circuit-switched and/or packet-based communications. It is further contemplated that networks 113-119 may include components and facilities to provide for signaling and/or bearer communications between the various components or facilities of system 100. In this manner, networks 113-119 may embody or include portions of a signaling system 7 (SS7) network, or other suitable infrastructure to support control and signaling functions. As such, the conjunction of networks 113-119 may be adapted to facilitate the remote configuration services of system 100.

Accordingly, the virtual credit card services of system 100 and/or user access to platform 121 may be initiated or performed over one or more of networks 113-119. As such, client devices 103, 123, and 125 may include any customer premise equipment (CPE) capable of sending and/or receiving information over one or more of networks 113-119. For instance, voice terminal 125 may be any suitable plain old telephone service (POTS) device, facsimile machine, etc., while mobile device 103 may be any cellular phone, radiophone, satellite phone, smart phone, wireless phone, or any other suitable mobile device, such as a personal digital assistant (PDA), pocket personal computer, tablet, customized hardware, etc. Further, computing device 123 may be any suitable computing device, such as a VoIP phone, skinny client control protocol (SCCP) phone, session initiation protocol (SIP) phone, IP phone, personal computer, softphone, workstation, terminal, server, etc.

Client devices 103, 123, and/or 125 and, in particular mobile device 103, can include one or more client programs that operate thereon for providing and/or facilitating the virtual credit card services of system 100. It is contemplated, however, that these client programs may be executed via platform 121 and, thereby, made accessible to users via, for instance, mobile devices 103, computing devices 123, and/or voice terminals 125. According to one embodiment, these client programs may relate to one or more GUIs configured to interface with the various services (or functions) of system 100, such as creating, customizing, and managing user profiles and/or requesting and receiving limited use transactional account numbers and, in certain instances, other information associated therewith, for configuring one or more point of sale interfaces (e.g., virtual credit card 101, bearer tag 105, etc.) for presentation at point sale terminals (e.g., point of sale terminal 107) in associated with a point of sale transaction. Additionally, the GUIs may be configured to facilitate the reporting of lost, stolen, or otherwise compromised virtual credit card information. The GUI applications may interface with the aforementioned web portal or otherwise networked application.

According to exemplary embodiments, user profiles repository 139 stores subscriber information, such as billing information, contact information, demographic information, location information, mobile device configurations, subscription parameters, associated virtual credit card information, one or more user defined policies for receiving virtual credit card information, and/or the like. User profiles repository 139 may also be utilized to store data relating to authorized users of the virtual credit card services of system 100, as well as associated authorization information corresponding to these users. Account numbers repository 141 may be utilized to store various virtual credit card offers, credit options, credit card issuer identifications, virtual credit card information, and/or the like, for facilitating the virtual credit card services of system 100. Information stored to account numbers repository 141 may be pending information corresponding to virtual credit card information that may be provided to a user in association with a request for a limited use transactional account number and/or may be assigned information corresponding to virtual credit card information that has been assigned to a user in association with a request for a limited use transactional account number.

Accordingly, it is contemplated that the physical implementation of repositories 139 and 141 may take on many forms, including, for example, portions of existing repositories of a service provider, new repositories of a service provider, third-party repositories, and/or shared-repositories. As such, repositories 139 and 141 may be configured for communication over system 100 via any suitable messaging protocol, such as lightweight directory access protocol (LDAP), extensible markup language (XML), open database connectivity (ODBC), structured query language (SQL), and the like, as well as combinations thereof. In those instances when repositories 139 and 141 are provided in distributed fashions, information and content available via repositories 139 and 141 may be located utilizing any suitable querying technique, such as electronic number matching, distributed universal number discovery (DUNDi), uniform resource identifiers (URI), etc.

Figure 2:
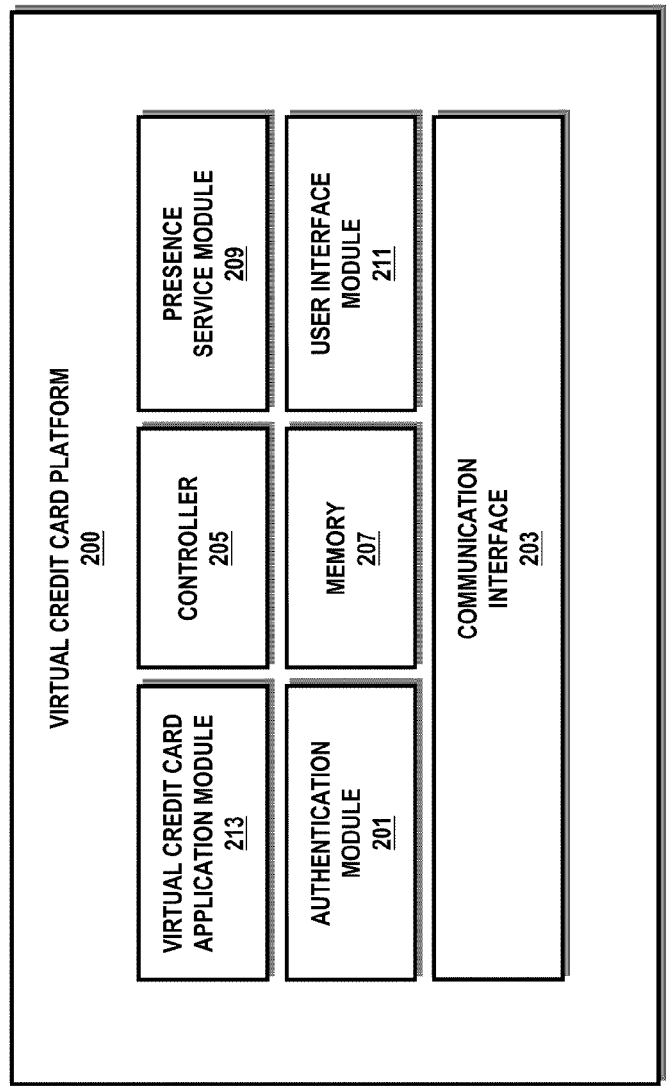
FIG. 2 is a diagram of a virtual credit card platform configured to facilitate virtual credit card services, according to an exemplary embodiment.

FIG. 2 is a diagram of a virtual credit card platform configured to facilitate virtual credit card services, according to an exemplary embodiment. Virtual credit card platform (or platform) 200 may comprise computing hardware (such as described with respect to FIG. 13), as well as include one or more components configured to execute the processes described herein for facilitating the virtual credit card services of system 100. In one implementation, platform 200 includes authentication module 201, communication interface 203, controller (or processor) 205, memory 207, presence service module 209, user interface module 211, and virtual credit card account module 213. It is noted that platform 200 may communicate with one or more credit card issuers 127, as well as one or more repositories, such as user profiles repositories 139 and account numbers repository 141. Further, users may access platform 200 (or the features and functionalities provided thereby) via client devices 103, 123, and 125. While specific reference will be made to this particular implementation, it is also contemplated that platform 200 may embody many forms and include multiple and/or alternative components. For example, it is contemplated that the components of platform 200 may be combined, located in separate structures, and/or separate locations.

According to exemplary embodiments, platform 200 embodies one or more application servers accessible to client devices 103, 123, and 125 over one or more of networks 113-119. Users (or subscribers) can access platform 200 to request and receive limited use transactional account numbers associated with virtual credit cards (e.g., virtual credit card 101), as well as to create, customize, and manage one or more user profiles for receiving limited use transactional account numbers. In certain instances, platform 200 may further provide users with one or more virtual credit options associated with one or more credit offers associated with credit card issuers (or institutions) 127. These credit option(s) may include various terms, conditions, and/or agreements specified by credit card issuer(s) 127 that must be accepted before credit card issuer(s) 127 would be willing to extend credit to the user in association with the request for a limited use transactional account number. For instance, the credit options may include various groupings of benefits, expiration values, fees, grace periods, interest rates, monetary limits, privacy policies, transaction limits, vendor limits, etc., which may be collectively referred to as virtual credit card member agreement information. As such, platform 200 via, for example, user interface module 211 may be configured to provide one or more user interfaces, e.g., web portals and/or other networked applications, to permit users to access the features and functions of platform 200 via client devices 103, 123, and 125. According to certain embodiments, user interface module 211 may be configured for exchanging information between client devices 103, 123, and 125 and browser applications or other network-based applications or systems, such as voice browsers or interactive voice recognition systems.

In exemplary embodiments, platform 200 via, for instance, user interface module 211 may be configured to execute one or more graphical user interfaces (GUI) that are configured to provide users with one or more menus of options for creating, customizing, and managing user profiles, as well as engaging with the other features and functions of platform 200, such as to request and receive limited use transactional account numbers associated with virtual credit cards (e.g., virtual credit card 101). In other instances, these user interfaces may be utilized by subscribers to indicate to a service provider of the virtual credit card services of system 100 and/or one or more credit card issuers that a limited use transactional account number has been lost, stolen, or otherwise compromised. In this manner, platform 200 via, for instance virtual credit card application module 213 may be configured to terminate (or otherwise deactivate) virtual credit card services associated with reportedly compromised limited use transactional account numbers and, in certain embodiments, to configure one or more reportedly compromised point of sale interfaces (e.g., virtual credit card 101, bearer tag 105, etc.) with "false" or "trick" limited use transactional account numbers that, when utilized in association with a subsequent point of sale transaction, are additionally configured to alert one or more authoritative agencies, e.g., a service provider of the virtual credit card services of system 100, the police, the federal bureau of investigation, etc.

Accordingly, platform 200 includes virtual credit card application module 213 for receiving requests for limited use transactional account numbers associated with virtual credit cards (e.g., virtual credit card 101) and, in response thereto, retrieve user profile information from, for example, user profiles repository 139 and/or parse received requests for information to facilitate generation of one or more virtual credit card applications for transmission to one or more credit card issuers 127 for acquiring one or more credit options associated with one or more limited use transactional account numbers associated with one or more virtual credit cards. These received credit options and limited use transactional account numbers may be stored to account numbers repository 141 or any other suitable storage location of (or accessible to) platform 200. According to exemplary embodiments, these credit options are provided to users at one or more client devices, e.g., mobile device 103, computing device 123, and/or voice terminal 125, for selecting a particular credit option to receive a limited use transactional account number in association therewith. As such, virtual credit card application module 213 may also be configured to receive from, for example, communication interface 203 and/or user interface module 211, indications of selections of particular credit options from users, e.g., from one or more client devices, e.g., client devices 103, 123, and 125. Based on the indications, virtual credit card application module 213 may be configured to receive associated limited use transactional account numbers and/or other information associated therewith from, for example, account numbers repository 141 or may query associated credit card issuers for this information. In any event, the associated limited use transactional account number and/or information associated therewith, also collectively referred to as virtual credit card information, may be transmitted to users at one or more client devices for configuring one or point of sale interfaces (e.g., virtual credit card 101, bearer tag 105, etc.) with the virtual credit card information for presentation at a point of sale interface (e.g., point of sale interface 107) in association with a point of sale transaction. It is noted that an exemplary process for providing credit options, limited use transactional account numbers, and/or information associated therewith to requesting subscribers is described in more detail with FIG. 6.

Platform 200 may also include presence service module 209 for determining spatial positioning information associated with mobile devices 103 for use providing limited use transactional account numbers to subscribers. That is, presence service module 291 may be configured to determine presence information related to, for example, locations of mobile devices 103 for providing subscribers with credit options from one or more credit card issuers (e.g., credit card issuers 127) within a predefined proximity of the respective locations. It is noted that the presence information may be received from corresponding mobile devices 103 and, thereby, tracked via presence service module 209 or presence service module 209 may "poll" mobile devices 103 for the presence information. An exemplary model for presence determination is detailed in Internet Engineering Task Force (IETF) Request for Comment (RFC) 2778, which is incorporated herein by reference in its entirety. According to certain embodiments, the presence or availability of mobile devices 103 may be utilized to provide credit options, limited use transactional account numbers, and/or information associated therewith to requesting subscribers, as is more readily understood with reference to FIG. 6.

In order to provide selective access to the features and functions of the virtual credit card services of system 100, platform 200 may also include authentication module 201 for authenticating and/or authorizing users to platform 200 and/or access to the features and functions of one or more of virtual credit card applications, such as virtual credit card applications 111a and/or 111b. It is contemplated that authentication module 201 may operate in concert with communication interface 203 and/or user interface module 211. That is, authentication module 201 may verify user provided credential information acquired via communication interface 203 and/or user interface module 211 against corresponding credential information stored within a user profile of, for instance, user profiles repository 139. By way of example, the credential information may include "log on" information corresponding to a user name, password, coded key, or other unique identification parameter, such a personal identification number (PIN), credit verification value (CVV), etc. In other instances, the credential information may include any one or combination of a birth date, an account number (e.g., bank, credit card, billing code, limited use transactional account number, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, biometric code, voice print, etc. Subscribers may provide this information via client devices 103, 123, and 125, such as by spoken utterances, dual-tone multi-frequency (DTMF) signals, packetized transmission, etc. It is contemplated that unobtrusive security may be provided by positively identifying and screening users based on one or more of the aforementioned credentials which may be seamlessly provided when client devices 103, 123, and 125 communicate with platform 200, such as a unique IP or MAC address. Other unobtrusive measures can be made available via voice prints, etc.

Additionally, platform 200 may include one or more controllers (or processors) 205 for effectuating the aforementioned features and functions of platform 200, as well as one or more memories 207 for permanent and/or temporary storage of one or more of the aforementioned variables, parameters, information, signals, messages, identifiers, addresses, locators, etc. In this manner, the features and functions of platform 200 may be executed by platform 200, such as in response to controller(s) 205 (or other components of platform 200) executing computer program code (or other instructions) stored to one or more memories 207.

Figure 3:
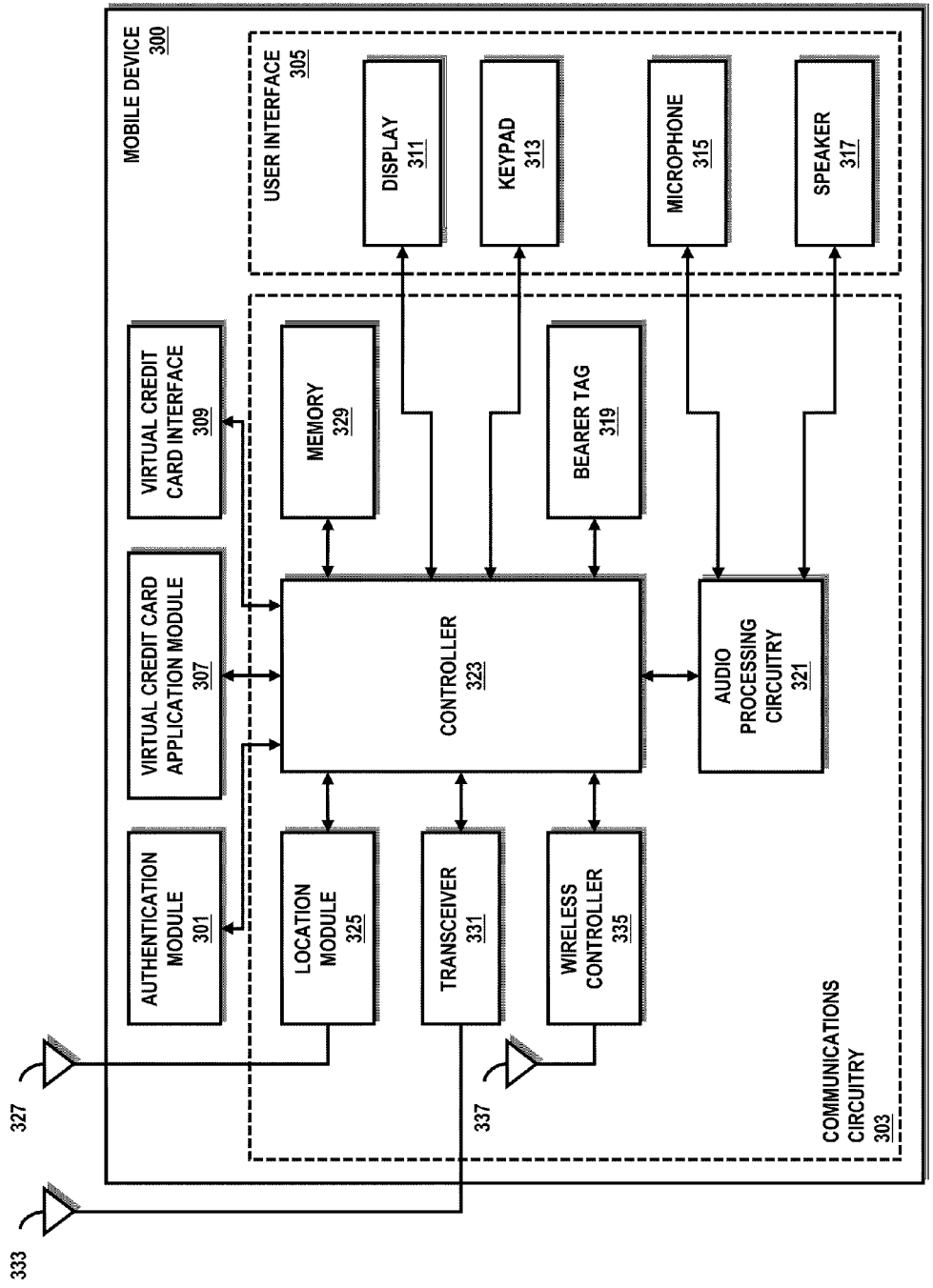
FIG. 3 is a diagram of a mobile device configured to facilitate virtual credit card services, according to an exemplary embodiment.

FIG. 3 is a diagram of a mobile device configured to facilitate virtual credit card services, according to an exemplary embodiment. Mobile device 300 may comprise computing hardware (such as described with respect to FIG. 13), as well as include one or more components configured to execute the processes described herein for facilitating the virtual credit card services of system 100. In this example, mobile device 300 includes authentication module 301, communications circuitry 303, user interface 305, virtual credit card application module 307, and virtual credit card interface 309. While specific reference will be made hereto, it is contemplated that mobile device 300 may embody many forms and include multiple and/or alternative components.

According to exemplary embodiments, user interface 305 may include one or more displays 311, keypads 313, microphones 315, and/or speakers 317. Display 311 provides one or more graphical user interfaces (GUI) that permit users of mobile device 300 to view dialed digits, call status, menu options, and other service information, as well as interact with one or more interfaces associated with virtual credit card application 307 and/or virtual credit card interface 309 for requesting and receiving limited use transactional numbers associated with virtual credit cards (e.g., virtual credit card 101) and, thereby, configuring one or more point of sale interfaces (e.g., virtual credit card 101, bearer tag 319, and/or display 311) with the limited use transactional account number and, in certain instances, other associated information, e.g., associated billing address information, credit card type information, credit verification value, one or more expiration values, identifier of an issuing credit institution, identifier of a subscriber authorized to use the limited use transactional account number, and/or the like. These interfaces, such as GUIs, may include various icons, menus, options, parameters, values, variables, and widgets, as well as other text, symbols, and interface elements to facilitate the processes described herein. It is noted that certain exemplary user interfaces are described in more detail in conjunction with FIGS. 9-11. In any event, keypad 313 may include an alphanumeric keypad and may represent other input controls, such as one or more button controls, dials, joysticks, touch panels, etc. As such, a user may utilize one or more components of user interface 305 to construct user profiles, enter commands, initialize applications (e.g., virtual credit card application 111a and/or 111b), input remote addresses, select options from menu systems, and the like. In this manner, it is noted that microphone 315 coverts spoken utterances of a user (or other auditory sounds, e.g., environmental sounds) into electronic audio signals, whereas speaker 317 converts audio signals into audible sounds.

Communications circuitry 303 may include at least one audio processing circuitry 321, bearer tag 319, controller (or processor) 323, location module 325 (such as a GPS receiver) coupled to antenna 327, memory 329, transceiver 331 coupled to antenna 333, and wireless controller 335 coupled to antenna 337. In this manner, memory 329 may represent a hierarchy of memory, which may include both random access memory (RAM) and read-only memory (ROM). Computer program instructions (or code) and corresponding data for operation can be stored in non-volatile memory, such as erasable programmable read-only memory (EPROM), electrically erasable programmable read-only memory (EEPROM), and/or flash memory. Memory 329 may be implemented as one or more discrete devices, stacked devices, or integrated with at least one controller 323. Memory 329 may store information, such as one or more user profiles, one or more user defined policies (e.g., one or more user defined polices for requesting and/or receiving limited use transactional account numbers associated with virtual credit cards), one or more contact lists, limited use transactional account numbers, personal information, sensitive information, work related information, configurable setting parameters, other associated virtual credit card information (e.g., associated billing address information, credit card type information, credit verification values, expiration values, identifiers of issuing credit card issuers (or institutions), identifier of a subscriber authorized to use the limited use transactional account numbers, etc.), and/or the like.

Even though not illustrated, it is contemplated that mobile device 300 may also include one or more applications and, thereby, may store (via memory 329) data associated with these applications for providing users with browsing functions, business functions, calendar functions, communication functions, contact managing functions, data editing (e.g., database, word processing, spreadsheets, etc.) functions, financial functions, gaming functions, imaging functions, location determination functions, messaging (e.g., electronic mail, instant messaging, enhanced messaging, multimedia messaging, short messaging, etc.) functions, multimedia functions, service functions, storage functions, synchronization functions, task managing functions, querying functions, and the like.

According to exemplary embodiments, memory 329 may also include computer program code (or instructions, commands, etc.) corresponding to virtual credit card application 111a. Memory 329 and the computer program code may be configured to, with at least one processor 323, cause mobile deice 300 at least to generate requests for limited use transactional account numbers associated with one or more virtual credit cards (e.g., virtual credit card 101), transmit the requests to platform 121, receive (in response thereto) one or more credit options and/or the limited use transactional account numbers, and configure, for presentation at point of sale terminals (e.g., point of sale terminal 107), one or more point of sale interfaces (e.g., bearer tag 319, display 311, virtual credit 101, etc.) with the limited use transactional account numbers and/or other information associated with the limited use transactional account numbers. It is noted that an exemplary process for requesting and receiving limited use transactional account numbers is described in more detail with FIG. 5, whereas an exemplary process for configuring and removing virtual credit card information from one or more point of sale interfaces is more fully explained in conjunction with FIGS. 7-12.

It is generally noted, however, that mobile device 300 may include virtual credit card interface 309 for configuring one or more point of sale interfaces, such as virtual credit card 101, bearer tag 319, and/or display 311, with virtual credit card information (e.g., limited use transactional account numbers and/or information associated therewith) for presentation at a point of sale terminal (e.g., point of sale terminal 107) in association with a point of sale transaction. It is particularly noted that virtual credit card interface 309 is described in more detail with FIGS. 9-11.

It is also contemplated that mobile device 300 may, in certain embodiments, assume one or more of the aforementioned features of platform 200 and/or function in concert with platform 200. As such, mobile device 300 includes one or more client programs, instructions, and/or code that operate thereon to access and/or execute these functions; however, it is contemplated that these client programs may be executed by platform 200 (or another facility of system 100) and, thereby, be made accessible to users via mobile device 300. In this manner, mobile device 300 may include authentication module 301 and virtual credit card application module 307 (e.g., virtual credit card application 111a and/or 111b) for assuming one or more of the aforementioned functions described with respect to platform 200. In this way, modules 301 and 307 may further operate similarly to modules 201 and 213 of platform 200. It is noted that spatial positioning information may be acquired via location module 325 (as described below), or may be determined, additionally (or alternatively) via presence service module 211.

Accordingly, controller 323 may be configured to control the operation of mobile device 300, such as in response to commands received from virtual credit card application 111a and/or 111b, as well as data stored to memory 329. Control functions may be implemented in a single controller or via multiple controllers. Suitable controllers 323 may include, for example, both general purpose and special purpose controllers and digital signal processors. Controller 323 may interface with audio processing circuitry 321, which provides basic analog output signals to speaker 317 and receives analog audio inputs from microphone 315.

It is noted that real time spatial positioning information may be obtained or determined via location module 325 using, for instance, satellite positioning system technology, such as GPS technology. In this way, location module 325 can behave as (or substantially similar to) a GPS receiver. Thus, mobile device 300 employs location module 325 to communicate with constellation 137 of satellites. These satellites 137 transmit very low power interference and jamming resistant signals received by GPS receivers 325 via, for example, antennas 327. At any point on Earth, GPS receiver 325 can receive signals from multiple satellites, such as six to eleven. Specifically, GPS receiver 325 may determine three-dimensional geolocation (or spatial positioning information) from signals obtained from at least four satellites. Measurements from strategically positioned satellite tracking and monitoring stations are incorporated into orbital models for each satellite 137 to compute precise orbital or clock data. Accordingly, GPS signals may be transmitted over two spread spectrum microwave carrier signals that can be shared by GPS satellites 137. Thus, if mobile device 300 is able to identify signals from at least four satellites 137, receivers 325 may decode the ephemeris and clock data, determine the pseudo range for each satellite 137 and, thereby, compute the spatial positioning of a receiving antenna 327. With GPS technology, mobile device 300 can determine its spatial position with great accuracy and convenience.

Additionally, mobile device 300 may employ assisted GPS (A-GPS) to mitigate the loss of GPS signals from obstructions between GPS receiver 325 and satellites 137. When operating in A-GPS mode, mobile device 300 can provide for better in building or obstructed view spatial positional information. Assistance data can be transmitted to mobile device 300 from, for example, wireless network 119. In an exemplary embodiment, A-GPS information may include ephemeris data, differential GPS correction data, timing data, and/or other aiding data. Using the aiding (or assistance) data, location module 325 performs spatial positioning calculations via, for example, controller (or processor) 323. In an exemplary embodiment, mobile device 300 can generate real-time speed and route adherence information using this calculated information. Additionally, transmission of the spatial positional information need not be frequent. Further, transmission of the geolocation data can be made more compact because it may be "true" location information rather than pseudo range data. Also, mobile device 300 can more intelligently request assistance data because mobile device 300 can itself determine when ephemeris data may no longer be valid. It is contemplated, however, that location module 325 may utilize one or more other (or additional) location determination technologies, such as advanced forward link triangulation (AFLT), angle of arrival (AOA), cell identification (cell ID), observed time difference of arrival (OTDOA), enhanced observed time of difference (E-OTD), enhanced forward link trilateration (EFLT), network multipath analysis, wireless local area network (WLAN) positioning, and the like. In any case, determined spatial positional information may be transmitted to platform 200 via bearer tag 321, transceiver 331, and/or wireless controller 335 as part of (or in association with) a request for a limited use transactional account number, as will become more apparent below.

It is generally noted that wireless controller 335 may additionally (or alternatively) be employed to communicate with a wireless headset (not shown) or other wireless network. The headset can employ any number of standard radio technologies to communicate with wireless controller 335, such as, for example, BLUETOOTH-enabled technologies. It is contemplated that other equivalent short range radio technology and protocols may be utilized.

Figure 4:
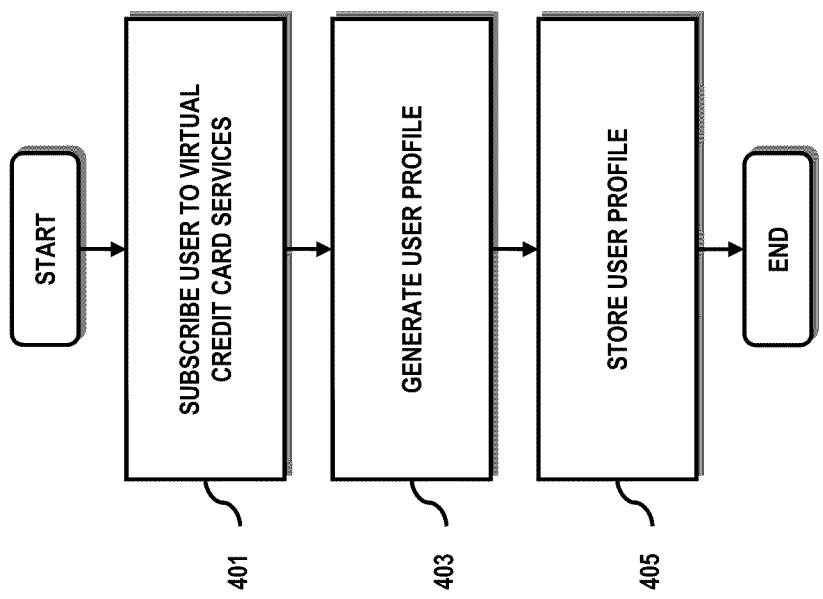
FIG. 4 is a flowchart of a process for registering a user to virtual credit card services, according to an exemplary embodiment.

FIG. 4 is a flowchart of a process for subscribing a user to virtual credit card services, according to an exemplary embodiment. For illustrative purposes, the process is described with respect to FIGS. 1 and 2. It is noted that the steps of the process may be performed in any suitable order, as well as combined or separated in any suitable manner. At step 401, platform 200 subscribes a user associated with one or more mobile devices (e.g., mobile device 103) to the virtual credit card services of system 100. According to one embodiment, the user may subscribe utilizing any suitable client device capable of processing and transmitting information over one or more of networks 113-119, such as computing device 123. Namely, the user may interact with an input interface (e.g., a keyboard, interactive voice response (IVR) interface, etc.) of, for example, computing device 123 to activate software resident on computing device 123, such as a GUI or other networked application, that interfaces with (or is implemented by) platform 200, such as one or more GUIs implemented via user interface module 211. Alternatively, the user may interact with a voice portal (not shown) interfacing with (or implemented by) platform 200, wherein speech synthesis and voice recognition techniques are utilized to prompt the user for various information and to reduce spoken utterances and/or other signals (e.g., dual tone multi-frequency signals) associated with the user to one or more corresponding inputs. As such, the user can register as a new subscriber to the virtual credit card services and may obtain sufficient authentication information for establishing future sessions with platform 200. In certain embodiments, registration procedures may prompt the user to identify those client devices (e.g., client devices 103, 123, and 125) that the user may employ to interact with the virtual credit card services of system 100. In this manner, registered client devices (e.g., client devices 103, 123, and 125) may be logically associated with the user.

Once registered (or as part of the registration process), platform 200 may enable the user, per step 403, to generate a user profile including, for example, existing credit card account information and/or other user profile information, such as username, password, other service provider account information, billing information, configuration information, etc., as well as one or more user-defined virtual credit card policies for requesting and receiving limited use transactional account numbers associated with virtual credit cards, such as virtual credit card 101, and/or other like information, e.g., user demographics, group/organizational affiliations, memberships, interests, etc. It is also noted that this user profile information may include addressing information associated with specified client devices, such as, for example, one or more directory addresses, electronic serial numbers, international mobile equipment identifiers, machine access control addresses, mobile directory numbers, mobile equipment identities, mobile identification numbers, internet protocol addresses, port addresses, and/or any other suitable address, as well as include other service related information, parameters, polices, variables, etc. At step 405, platform 200 stores the user to a list of subscribers to the virtual credit card services of system 100, as well as stores the generated user profile, authentication information, client device addressing information, etc., to, for example, user profiles repository 139. It is noted, however, that platform 200 may additionally (or alternatively) store or synchronize this user profile information to any other suitable storage location and/or memory of (or accessible to) platform 200. Further, it is contemplated that users may directly interact with one or more of these storage locations and/or memories, such as user profiles repository 139.

Figure 5:
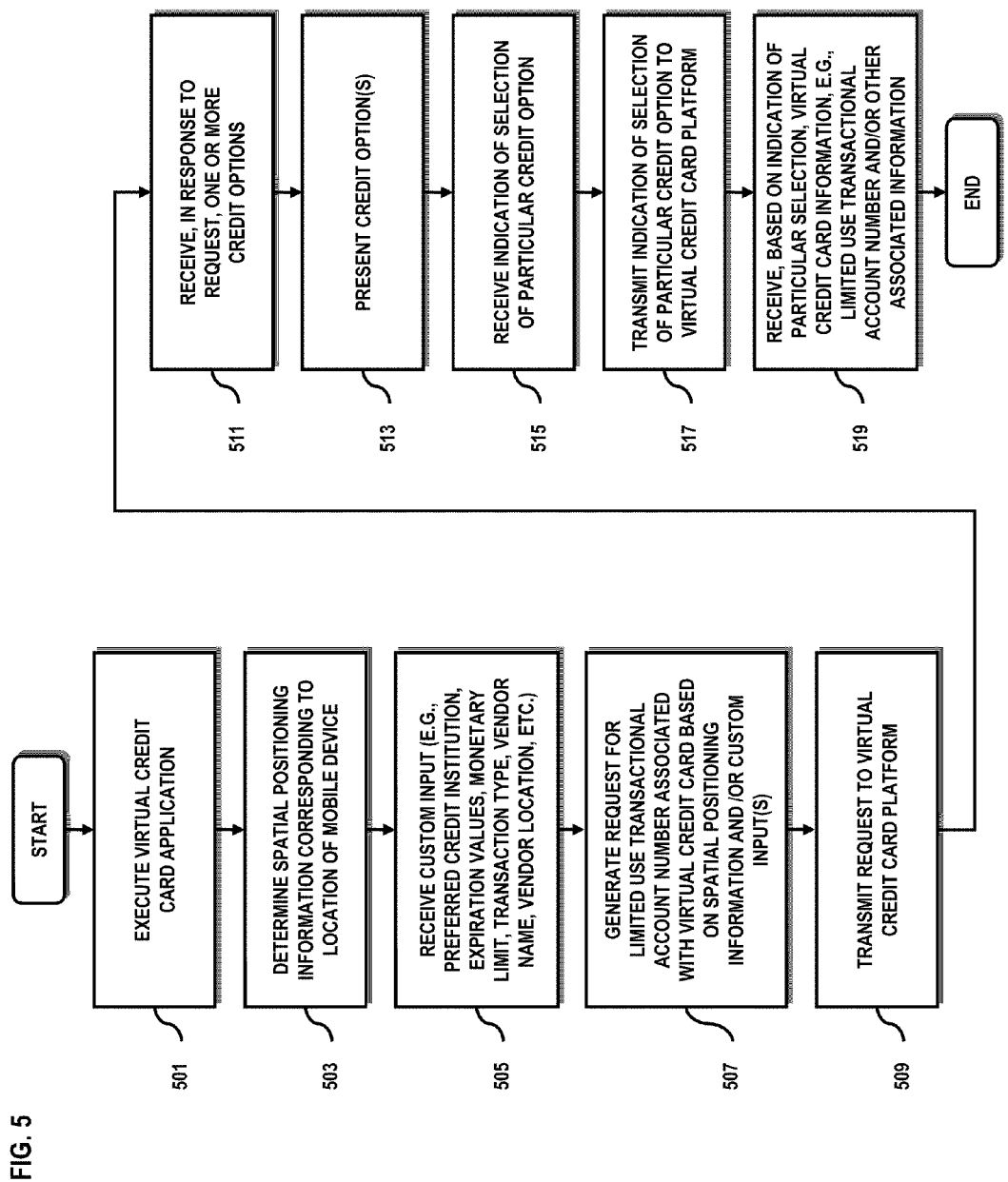
FIG. 5 is a flowchart of a process for receiving a limited use transactional account number associated with a virtual credit card, according to an exemplary embodiment.

Accordingly, users may employ one or more of virtual credit card applications 111a and 111b to request and receive limited use transactional account numbers associated with virtual credit cards, such as virtual credit card 101. FIG. 5 is a flowchart of a process for requesting and receiving a limited use transactional account number associated with a virtual credit card, according to an exemplary embodiment. For illustrative purposes, the process is described with reference to FIGS. 1-3. It is noted that the steps of the process may be performed in any suitable order, as well as combined or separated in any suitable manner. Furthermore, the process is explained as being implemented via virtual credit card application 111a of (or associated with) mobile device 103; however, the process may be implementable by (or in conjunction with) virtual credit card application 111b of (or associated with) platform 121. At step 501, mobile device 103 executes virtual credit card application 111a, such as for requesting and receiving a limited use transactional account number associated with virtual credit card 101. It is noted that before gaining access to the features and functions of virtual credit card application 111a, a subscriber may be required to provide sufficient credential information, such as a username and password combination for authentication and/or authorization purposes, which may be effectuated via authentication module 301 and/or 201. In this manner, execution of virtual credit card application 111a may cause mobile device 300 to present, via display 311, one or more GUIs, menus, options, selections, etc., enabling a subscriber to interface with the features and functions of the virtual credit cards services of system 100.

In certain embodiments, mobile device 103 may determine spatial positioning information corresponding to a location of mobile device 103 via, for example, location module 325, per step 503. As will become more apparent below, this (and/or related) spatial positioning information may be include within (or associated with) a request for a limited use transactional account number, such as for requesting a limited use transactional account number from one or more credit card issuers (e.g., credit card issuers 127) within a predefined proximity of the spatial positioning information. Further, users may provide one or more custom inputs to the one or GUIs, menus, options, selections, etc., for requesting a limited use transactional account number, such as one or more preferred credit institutions, expiration values (e.g., expiration date, expiration time, predefined number of transactions, etc.), monetary limits, transaction types, vendor names, vendor locations, and the like. Accordingly, at step 505, mobile device 103 may receive one or more of these custom inputs. In step 507, mobile device 103 generates via, for example, virtual credit card application module 307, a request for a limited use transactional account number associated with virtual credit card 101 based on the determined spatial positioning information and/or received custom input(s). It is noted that the request may include (or otherwise be associated with) the spatial positioning information and/or custom input(s). In any event, the request and any other information, parameter, value, variable, etc., may be transmitted to, for instance, platform 200 via, for instance, transceiver 331 and/or wireless controller 335, per step 509.

According to various exemplary embodiments, in step 511, mobile device 103 may receive, in response thereto, one or more credit options from, for instance, platform 200 and/or one or more credit card issuers (or institutions) 127 for presentation. These credit option(s) may include various terms, conditions, and/or agreements specified by credit card issuer(s) 127 that must be accepted before credit card issuer(s) 127 would be willing to extend credit to the user in association with the request for the limited use transactional account number. In step 513, the credit options are presented. For instance, the credit options may include various groupings of benefits, expiration values, fees, grace periods, interest rates, monetary limits, privacy policies, transaction limits, vendor limits, etc., hereinafter collectively referred to as virtual credit card member agreement information. As such, mobile device 103 may receive via, for instance, a user interface of (or associated with) virtual credit card application 111a, an indication of a selection of a particular one of the credit options (e.g., virtual credit card member agreement information), in step 515. In this manner, mobile device 103 may transmit the indication via, for instance, transceiver 331 and/or wireless controller 335, to platform 200, at step 517. In response thereto, mobile device 103 may receive (per step 519) virtual credit card information, such as the limited use transaction account number and, in certain embodiments, other associated information, such as associated billing address information, credit card type information, credit verification value, one or more expiration values, identifier of an issuing credit institution, identifier of a subscriber authorized to use the limited use transactional account number, and/or the like. As will be described in more detail below, this virtual credit card account information may be utilized to configure one or more point of sale interfaces (e.g., virtual credit card 101, bearer tag 105, etc.) for presentation at a point of sale terminal (e.g., point of sale terminal 107) in association with a point of sale transaction.

Figure 6:
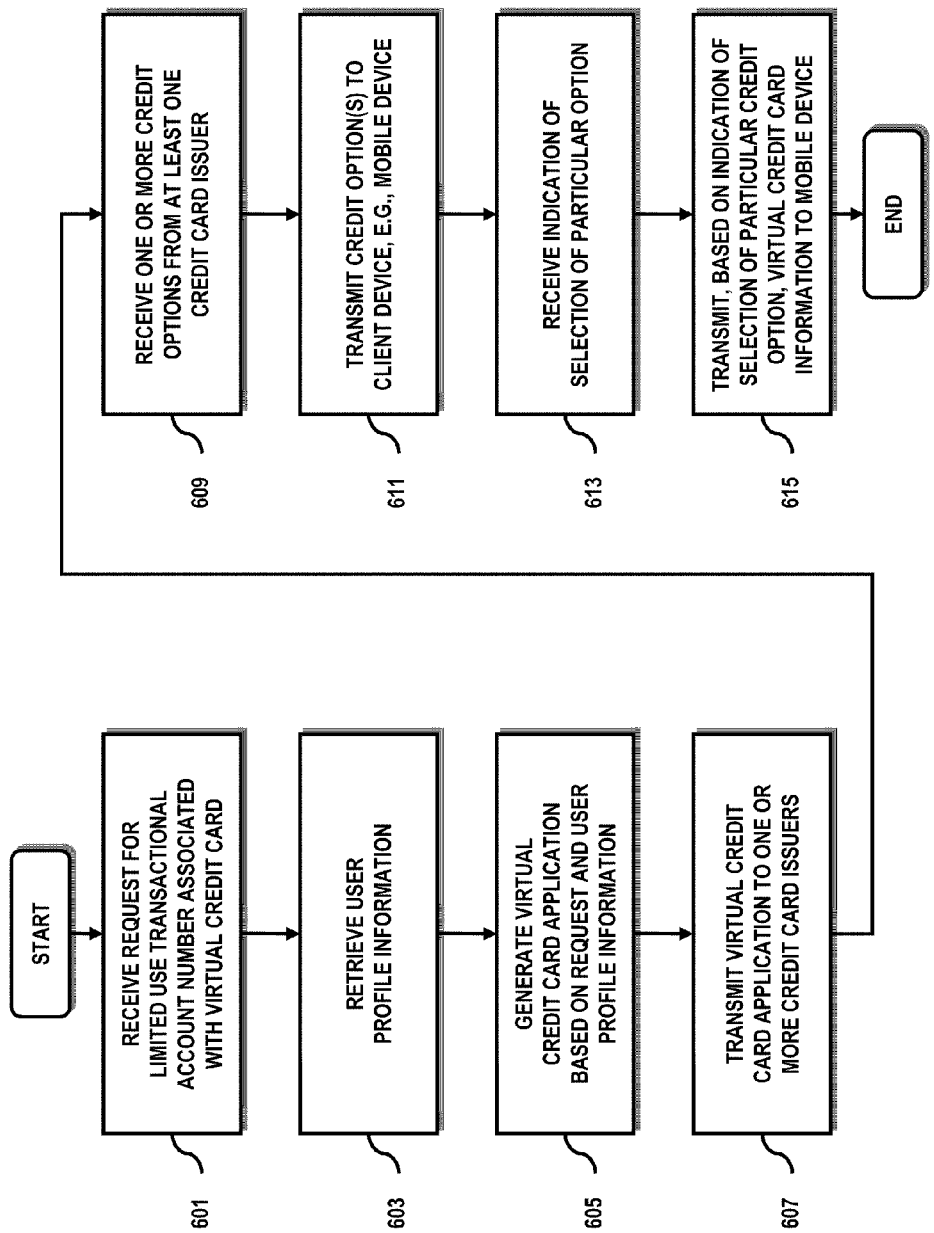
FIG. 6 is a flowchart of a process for providing a limited use transactional account number associated with a virtual credit card, according to an exemplary embodiment.

FIG. 6 is a flowchart of a process for providing a limited use transactional account number representing a virtual credit card, according to an exemplary embodiment. For illustrative purposes, the process is described with reference to FIGS. 1 and 2. It is noted that the steps of the process may be performed in any suitable order, as well as combined or separated in any suitable manner. Furthermore, the process is explained as being implemented by platform 200; however, the process may be implementable by (or in conjunction with) one or more components of mobile device 103. At step 601, platform 200 (e.g., virtual credit card application module 213) receives a request for a limited use transactional account number associated with a virtual credit card. According to certain embodiments, the request may be generated via one or more GUIs associated with user interface module 211 and, thereby, made available to virtual credit card application module 213 via user interface module 211. In other embodiments, the request may be generated via one or more client devices (e.g., mobile device 103) and, thereby, transmitted to platform 200 over one or more of networks 113-119. As such, the request may be received via communication interface 203 and, thereby, ported to virtual credit card application module 213. In certain embodiments, the request may include (or otherwise specify) associated information corresponding to a user requesting the limited use transactional account number, an identifier associated with a requesting device (e.g., an identifier associated with mobile device 103), spatial positioning information corresponding to a location of mobile device 103, and/or one or more custom inputs (e.g., one or more preferred credit institutions, expiration values (e.g., expiration date, expiration time, predefined number of transactions, etc.), monetary limits, transaction types, vendor names, vendor locations, and the like), which may be user-specified.

Based on, for example, information corresponding to the user or the identifier associated with the requesting device, virtual credit card application module 213 may, per step 603, retrieve user profile information from, for example, user profiles repository 139. Utilizing the user profile information and/or information from within (or specified in association with) the request, virtual credit card application module 213 may generate (at step 605) a virtual credit card application for requesting limited use transactional accounts numbers from one or more credit card issuers. As such, virtual credit card application module 213 may, in step 607, transmit the virtual credit card application to one or more credit card issuers (or institutions) 127 via, for example, communication interface 203. In particular embodiments, virtual credit card application module 213 may transmit the virtual credit card application to those credit card issuers within a predefined distance of spatial positioning information included within (or specified in association with) the request and, thereby, corresponding to a location of mobile device 103. Additionally (or alternatively), virtual credit card application module 213 may transmit virtual credit card applications to those credit card issuers 127 corresponding to one or more of the custom inputs, such as one or more preferred credit institutions, etc., included within (or specified in association with) the request and/or retrieved from user profiles repository 139.

In response to transmitting the virtual credit card application to the one or more credit card issuers (e.g., credit card issuers 127), platform 200 may receive via, for instance, communication interface 203, one or more credit options from at least one of the one or more credit card issuers 127, per step 609. These credit option(s) may include various terms, conditions, and/or agreements specified by credit card issuer(s) 127 that must be accepted before credit card issuer(s) 127 would be willing to extend credit to the user in association with the request for the limited use transactional account number. For instance, the credit options may include various groupings of benefits, expiration values, fees, grace periods, interest rates, monetary limits, privacy policies, transaction limits, vendor limits, etc., hereinafter collectively referred to as virtual credit card member agreement information. At step 611, platform 200 transmits the one or more credit options (or virtual credit card member agreement information) to, for example, the client device from which the user interacted with platform 200, such as mobile device 103; however, it is contemplated that the credit options may be provided to any other suitable client device, such as client devices 123 and 125. Accordingly, platform 200 receives, per step 613, an indication of a selection of a particular credit card option from, for instance, mobile device 103 or any of the other suitable client devices, e.g., client devices 123 and/or 125. At step 615, platform 200 transmits, based on the indication of the selection, virtual credit card information to the suitable client device (e.g., mobile device 103, computing device 123, or voice terminal 125) via, for example, communication interface 203. This virtual credit card information may, in exemplary embodiments, at least include the limited use transactional account number and/or other information associated therewith, such as associated billing address information, credit card type information, credit verification value, one or more expiration values, identifier of an issuing credit institution, identifier of a subscriber authorized to use the limited use transactional account number, and/or the like. As such, one or more configurable point of sale interfaces (e.g., virtual credit card 101, bearer tag 105, etc.) may be configured based on this virtual credit card information, such as for presentation at a point of sale terminal (e.g., point of sale terminal 107) in association with a point of sale transaction.

Figure 7:
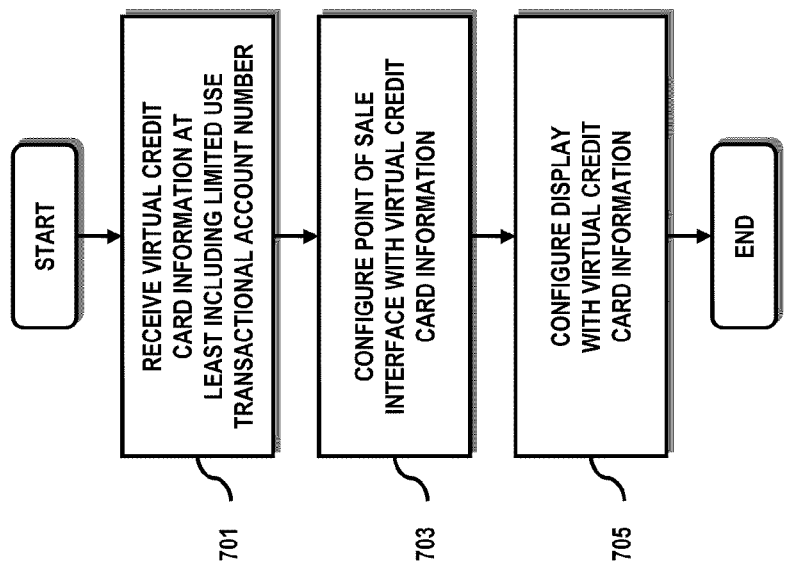
FIG. 7 is a flowchart of a process for configuring one or more point of sale interfaces with virtual credit card information, according to an exemplary embodiment.

FIG. 7 is a flowchart of a process for configuring one or more point of sale interfaces with virtual credit card information, according to an exemplary embodiment. For illustrative purposes, the process is described with reference to FIGS. 1 and 3. It is noted that the steps of the process may be performed in any suitable order, as well as combined or separated in any suitable manner. Furthermore, the process is explained as being implemented by mobile device 300; however, the process may be implementable by (or in conjunction with) any other client device including a suitable interface to configure a point of sale interface, such as a conductive strip (not shown) of virtual credit card 101, bearer tag 105, etc. At step 701, mobile device 300 receives virtual credit card information at least including a limited use transactional account number from, for example, platform 121 and/or a credit card issuer 127. According to exemplary embodiments, the credit card information may also include an associated billing address, credit card type, credit verification value, one or more expiration values, identifier of an issuing credit institution, identifier of a subscriber authorized to use the limited use transactional account number, a signature (or other unique mark) of the subscriber, and/or the like. In step 703, mobile device 300 configures via, for example, virtual credit card interface 309 one or more point of sale interfaces (e.g., a conductive strip (not shown) of virtual credit card 101, bearer tag 105, etc.) with the virtual credit card information. Exemplary point of sale interfaces are described in more detail with FIGS. 8-10. At step 705, mobile device 300 may additionally (or alternatively) configure display 311 with the virtual credit card information for presentation at a point of sale terminal, such as point of sale terminal 107. An exemplary display configured with virtual credit card information is more fully explained in conjunction with FIG. 11.

Figure 8:
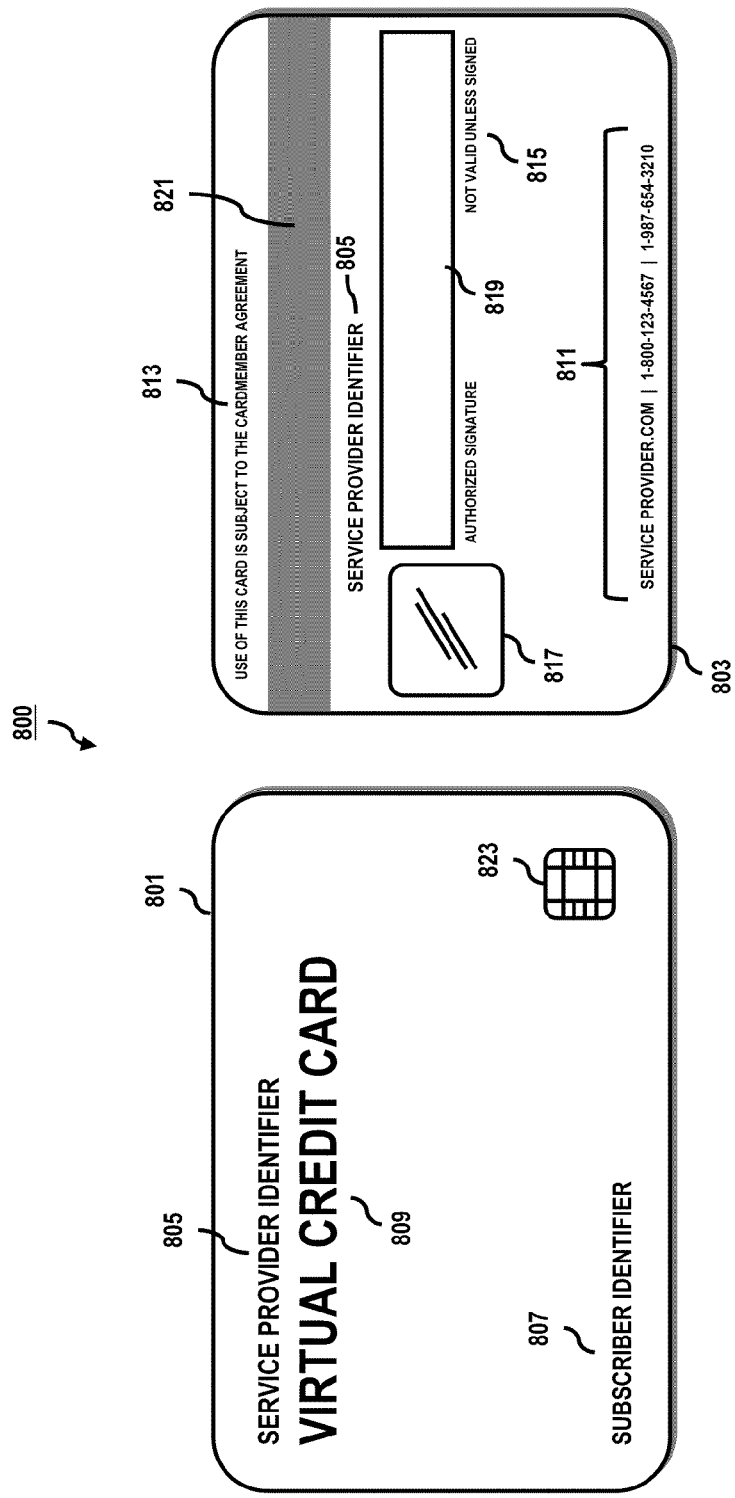
FIG. 8 is a diagram of a configurable point of sale interface, according to an exemplary embodiment.

FIG. 8 is a diagram of a configurable point of sale interface, according to an exemplary embodiment. For the purposes of illustration, configurable point of sale interface is described as a configurable credit card (or credit card) 800 having a plurality of faces, such as face 801 and face 803. In this example, face 801 may be a front face 801, whereas face 803 may be a back face 803, or vice versa. As shown, face 801 may include various generic credit card information, such as an identifier of a service provider (e.g., the service provider of the virtual credit card services of system 100) 805, an identifier of a subscriber 807 authorized to use credit card 800, and an identifier 809 of credit card 800. Likewise, face 803 may also include various generic credit card information, such as the identifier of the service provider 805, contact information 811 associated with the service provider, one or more conditional terms 813 and 815, and one or more security features, such as hologram 817 and signature block 819.

According to exemplary embodiments, credit card 800 also includes one or more configurable features, such as configurable conductive strip 821 and bearer tag 823, which may be dynamically configured with virtual credit card information, such as limited use transactional account numbers and/or other information associated with the limited use transactional account numbers, e.g., associated billing address information, credit card type information, credit verification value, one or more expiration values, identifier of an issuing credit institution, identifier of a subscriber authorized to use the limited use transactional account number, and/or the like. In one embodiment, configurable conductive strip 821 may be a configurable magnetic strip disposed on (e.g., (e.g., attached to, formed on, or otherwise protruding from) face 803, whereas bearer tag 823 may be a configurable RFID transponder (or other contactless transponder) disposed on (e.g., attached to, formed on, or otherwise protruding from) face 801. It is also noted that bearer tag 823 may be formed between faces 801 and 803 on one or more interlayer layers (not shown) of credit card 800. Further, conductive strip 821 may, in certain embodiments, be compatible with existing credit card readers, such as credit card reader 135, whereas bearer tag 823 may be compatible with existing bearer tag readers, such as bearer tag reader 129. According to exemplary embodiments, configurable features 821 and/or 823 may be dynamically configured via virtual credit card interface 309 of mobile device 300, which is explained in more detail with FIG. 9.

Figure 9:
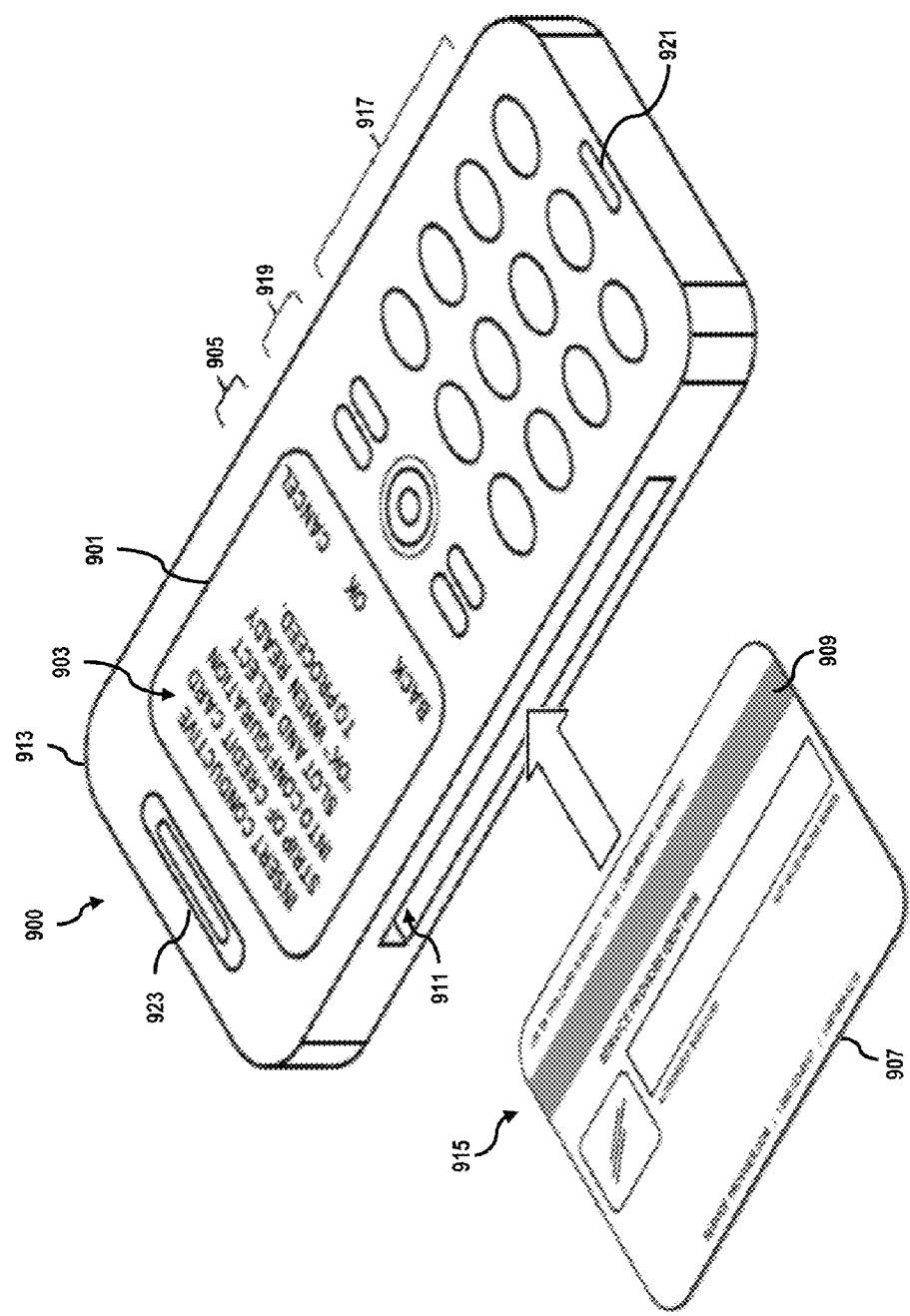
FIG. 9 is a diagram of a mobile device including a virtual credit card interface for configuring a point of sale interface, according to an exemplary embodiment.

FIG. 9 is a diagram of a mobile device including a virtual credit card interface for configuring a point of sale interface, according to an exemplary embodiment. For illustrative purposes, the point of sale interface of FIG. 9 is described with respect to a conductive strip of a virtual credit card point of sale interface, however, is similarly applicable to bearer tag virtual credit card point of sale interfaces. As shown, mobile device 900 includes display 901 presenting, for example, one or more configuration instructions 903 and selectable options 905 for configuring point of sale interface 907, i.e., conductive strip 909 of point of sale interface 907, via virtual credit card interface 911. Virtual credit card interface 911 may be a slotted region within housing 913 of mobile device 900 that is configured to at least accept a distal end 915 of point of sale interface 907 at least including conductive strip 909.

According to exemplary embodiments, conductive strip 909 is a magnetic strip 909, such that virtual credit card interface 911 may include a magnetizing controller (not shown) configured to encode or otherwise store virtual credit card information to magnetic strip 909 of point of sale interface 907 when, for example, distal end 915 of point of sale interface is inserted into the slotted region of virtual credit card interface 911 and an "OK" option is selected or otherwise executed. It is noted that, in exemplary embodiments, encoding (or otherwise storing) virtual credit card information via magnetic strip 909 comprises setting the polarity of a plurality of magnets (not illustrated) of magnetic strip 909 via the magnetizing controller of virtual credit card interface 911 to, thereby, establish one or more magnetic flux reversals. That is, one or more magnetic flux reversals may be established via alternating changes in polarity from one magnet to another of magnetic strip 909. As such, one or more magnetic flux reversals may be encoded as a binary value (e.g., "1" or "0") that, when read via a conventional credit card reader, such as credit card reader 135, may be translated as the virtual credit card information encoded (or otherwise stored) to magnetic strip 909. As such, virtual credit card information may also be removed, modified, or otherwise re-encoded based on establishing the polarities of the magnets of magnetic strip 909.

In those instances when the virtual credit card point of sale interface is a bearer tag transponder, virtual credit card interface 909 may be configured to encode (or otherwise store) virtual credit card information to a microchip (or other storage medium) associated with an antenna (not shown) of the bearer tag transponder. As such, when a bearer tag reader (e.g., bearer tag reader 129) reads the bearer tag transponder, the bearer tag transponder may be configured to transmit the virtual credit card information stored to the microchip to the bearer tag reader via the associated antenna. As such, virtual credit card information may also be removed, modified, or otherwise re-encoded based on virtual credit card information being stored to and/or removed from the microchip of the bearer tag transponder.

It is also noted that control functions, such as "selecting" or "clicking" one or more of selectable options 905 may be provided via keyboard 917 and/or one or more additional (or alternative) input mechanisms 919, e.g., button controls, dials, joysticks, touch panels, etc. Mobile device 900 may also provide users with voice recognition and text-to-speech user interface technology via an audio interface of mobile device 900, e.g., the conjunction of microphone 921 and speaker 923. It is noted that although housing 913 is illustrated in a brick-like (or candy bar) fashion, it is contemplated that housing 913 may be provided in one or more additional (or alternative) fashions, such as in a foldable (or clamshell) housing, slide housing, swivel housing, etc.

Figure 10:
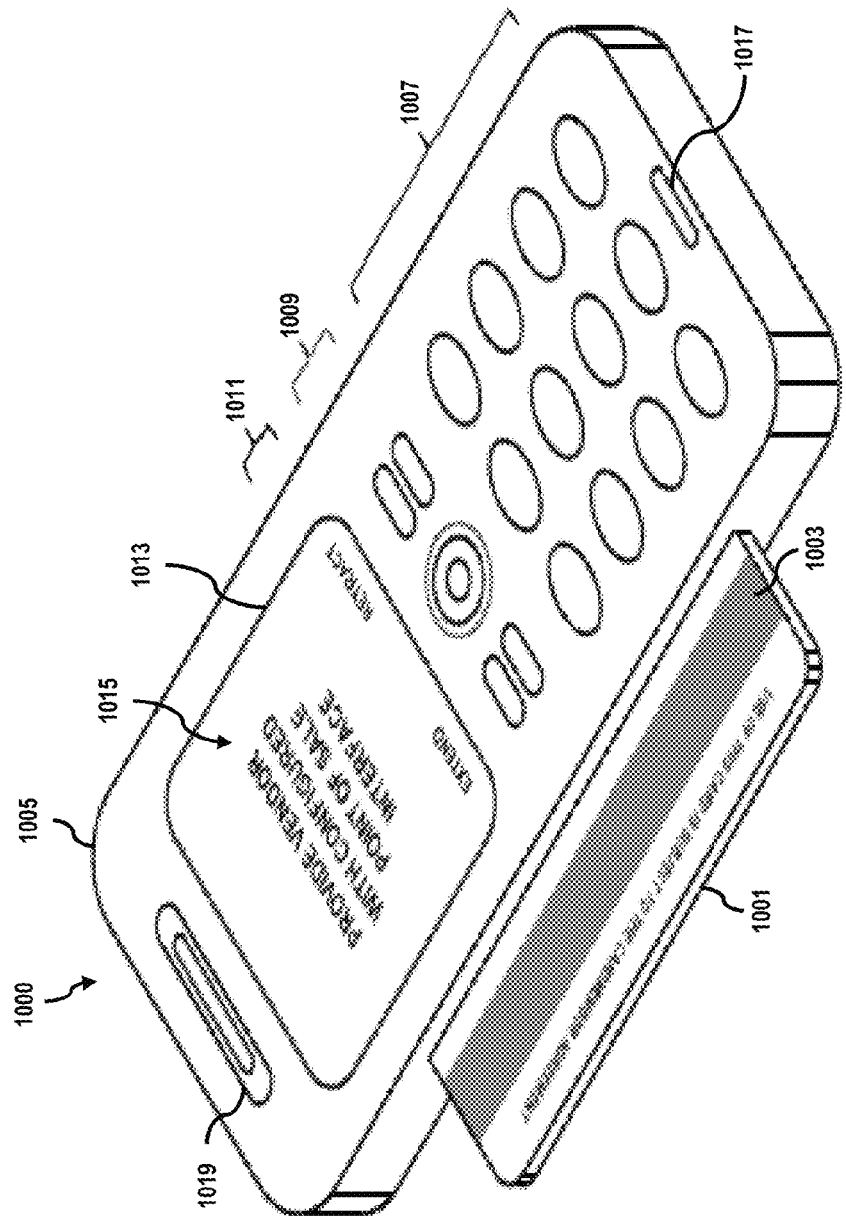
FIG. 10 is a diagram of a mobile device including a concealable point of sale interface that is configurable with virtual credit card information, according to an exemplary embodiment.

According to additional (or alternative embodiments), mobile devices 103 may also include retractable (or otherwise concealable) point of sale interfaces that are configurable with virtual credit card information, such as retractable conductive strips. FIG. 10 is a diagram of a mobile device including a concealable point of sale interface that is configurable with virtual credit card information, according to an exemplary embodiment. As shown, mobile device 1000 includes a retractable (or otherwise concealable) point of sale interface 1001 that includes a configurable conductive strip 1003 that may be encoded with virtual credit card information, such as limited use transactional account numbers and/or other information associated with the limited use transactional account numbers, such as associated billing address information, credit card type information, credit verification value, one or more expiration values, identifier of an issuing credit institution, identifier of a subscriber authorized to use the limited use transactional account number, and/or the like. In the depicted embodiment, point of sale interface 1001 may be retracted into housing 1005 of mobile device 1000 and, as such, extended therefrom for use in association with a point of sale transaction, such as for purchasing one or more products or services. Accordingly, mobile device 1000 may include keyboard 1007 and/or one or more additional (or alternatively) input mechanism 1009, e.g., button controls, dials, joysticks, touch panels, etc., for "selecting" or "clicking" one or more selectable options 1011. In this manner, selection of a first selectable option may be configured to extend point of sale interface 1001 from housing 1005, whereas a second selectable option may be configured to retract point of sale interface 1001 into housing 1005. Selectable options 1011 may be presented via display 1013 that may also be configured to present one or more instructions 1015 for utilizing point of sale interface 1001 in association with a point of sale transaction. Like mobile device 900, mobile device 1000 may provide users with voice recognition and text-to-speech user interface technology via an audio interface of mobile device 1000, e.g., the conjunction of microphone 1017 and speaker 1019. Further, even through housing 1005 is illustrated in a brick-like (or candy bar) fashion, it is contemplated that housing 1005 may be provided in one or more additional (or alternative) fashions, such as in a foldable (or clamshell) housing, slide housing, swivel housing, etc.

Figure 11:
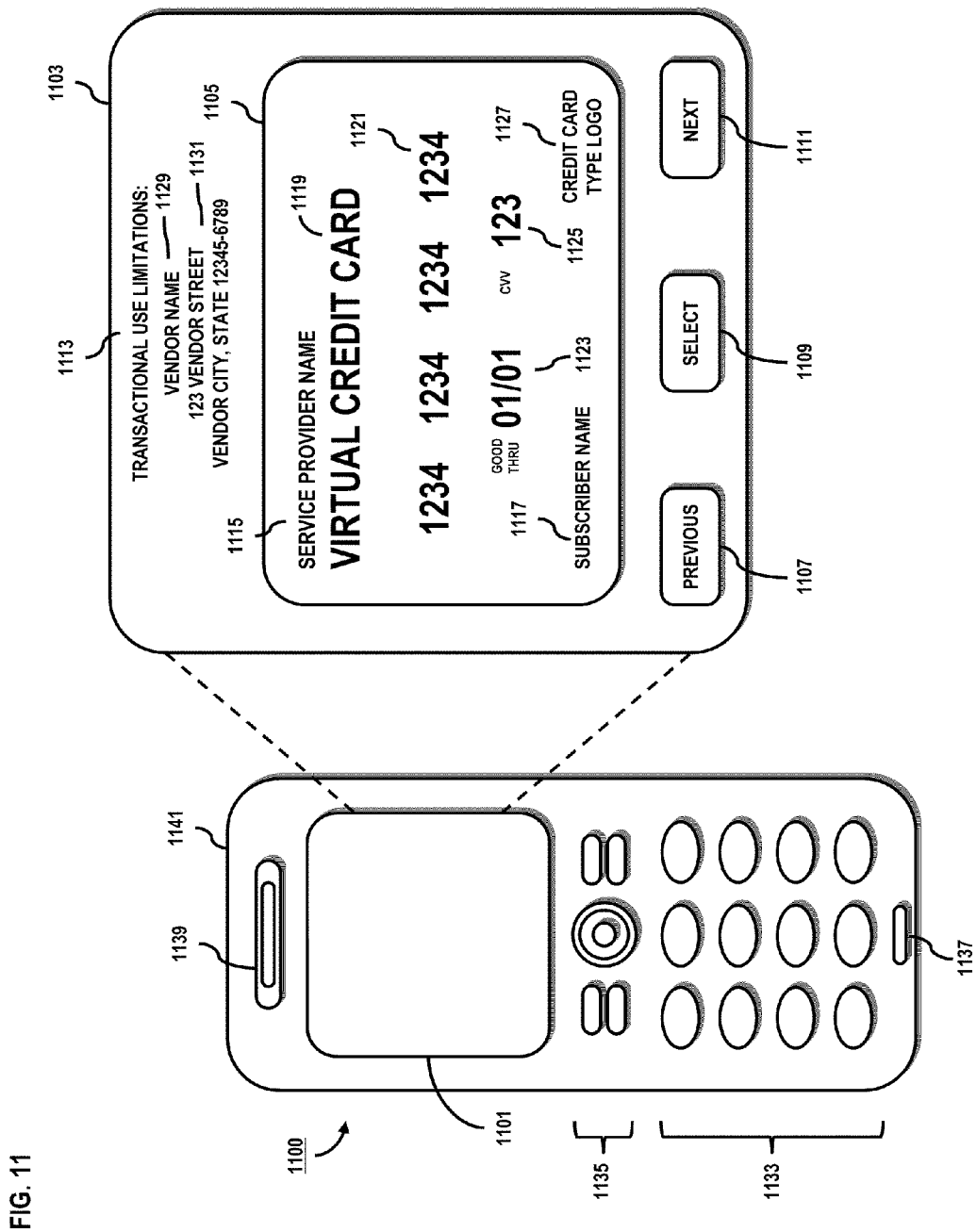
FIG. 11 is a diagram of a display of a mobile device presenting virtual credit card information, according to an exemplary embodiment.

As previously mentioned, a display of mobile devices 103 may be additionally (or alternatively) configured with virtual credit card information. FIG. 11 is a diagram of a display of a mobile device presenting virtual credit card information, according to an exemplary embodiment. In the depicted embodiment, mobile device 1100 includes display 1101 configured to provide a virtual credit card presentation (or presentation) 1103 comprising virtual credit card 1105, one or more selectable options (e.g., selectable options 1107, 1109, and 1111), and one or more transactional use limitations, such as transactional use limitation 1113. According to exemplary embodiments, virtual credit card 1105 may include both static and dynamic virtual credit card information. For instance, static virtual credit card information may include an identifier of a service provider (e.g., the service provider of the virtual credit card services of system 100) 1115, an identifier of a subscriber 1117 authorized to use virtual credit card 1105, and an identifier 1119 of virtual credit card 1105. Dynamic virtual credit card information, on the other hand, may include limited use transactional account number 1121, one or more expiration values (e.g., expiration date) 1123, credit verification code 1125, and credit card type logo 1127, such as American Express, Discover, MasterCard, Visa, and the like. In this manner, transactional use limitation 1113 may be, for example, a vendor-specific transactional use limitation, such as limiting use of virtual credit card 1105 to only transactions in association with a particular specified vendor (e.g., vendor 1129) at, for example, a particular specified location (e.g., location 1131). It is contemplated, however, that additional or other transactional use limitations may be provided, such as, for instance, transactional use limitations limiting use of virtual credit card 1105 to a specified number of transactions (e.g., one, two, three, etc.), one or more monetary limits, temporal limits, etc.

According to particular embodiments, mobile device 1100 may be configured to store virtual credit card information in association with a plurality of limited use transactional account numbers. In this manner, selectable options 1107-1111 may be selected (or otherwise interacted with) in order to toggle between and select particular ones of the limited use transactional account numbers. For example, selectable option 1107 may be configured to toggle to a previously presented virtual credit card, whereas selectable option 1111 may be configured to toggle to a proceeding virtual credit card. In certain exemplary embodiments, selectable option 1109 may be configured to select a "currently" presented virtual credit card and associated limited use transactional account number for configuration to one or more point of sale interfaces, such as virtual credit card 101 and/or bearer tag 105, and/or presentation at one or more point of sale terminals (e.g., point of sale terminal 107) in association with one or more point of sale transactions. It is also noted that presentation 1103 may be configured to present various other information associated with virtual credit card 1105, such as monetary information. For instance, virtual credit card 1105 may be utilized internationally and, thereby, in association with one or more currencies. As such, presentation 1103 may include one or more fields (not shown) for providing users with "local" and/or "exchanged" currency values, as well as "local" and/or "exchanged" monetary limits, remaining balances, etc., associated with virtual credit card 105 and/or with a "current" or "intended" transaction.

As with mobile devices 900 and 1000, mobile device 1100 may include keyboard 1133 and/or one or more additional (or alternatively) input mechanisms 1135, e.g., button controls, dials, joysticks, touch panels, etc., for "selecting" or "clicking" one or more of selectable options 1107-1111, as well as interaction with one or features of mobile device 1100. Further, mobile device 1100 may provide users with voice recognition and text-to-speech user interface technology via an audio interface of mobile device 1100, e.g., the conjunction of microphone 1137 and speaker 1139. Again, even though housing 1141 is illustrated in a brick-like (or candy bar) fashion, it is contemplated that housing 1141 may be provided in one or more additional (or alternative) fashions, such as in a foldable (or clamshell) housing, slide housing, swivel housing, etc.

Figure 12:
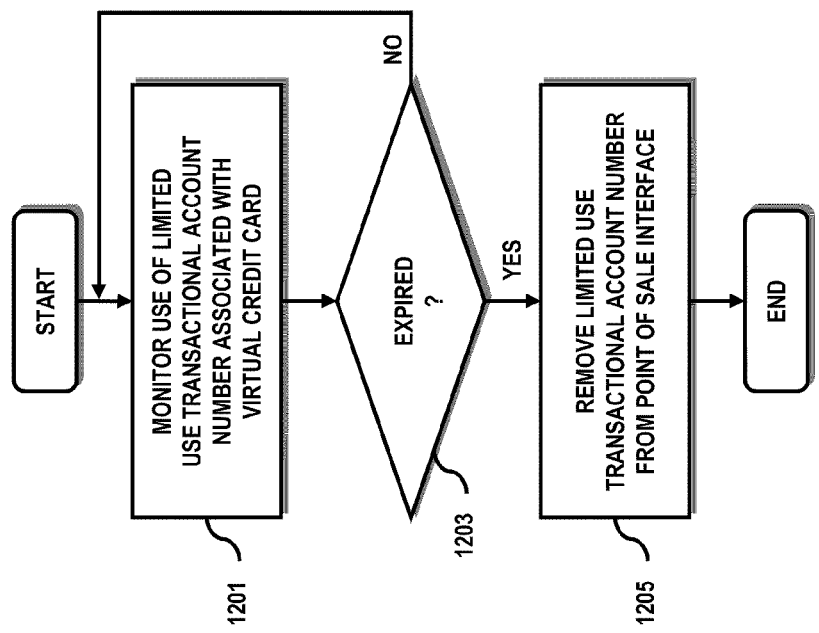
FIG. 12 is a flowchart of a process for removing virtual credit card information from a configurable point of sale interface, according to an exemplary embodiment.

FIG. 12 is a flowchart of a process for removing virtual credit card information from a configurable point of sale interface, according to an exemplary embodiment. For illustrative purposes, the process is described with reference to FIGS. 1 and 3. It is noted that the steps of the process may be performed in any suitable order, as well as combined or separated in any suitable manner. Furthermore, the process is explained as being implemented by mobile device 300; however, the process may be implemented by (or in conjunction with) any other client device including a suitable interface capable of configure a point of sale interface, such as a conductive strip (not shown) of virtual credit card 101, bearer tag 105, etc. At step 1201, mobile device 300 monitors (via, for example, virtual credit card account module 307) use of a limited use transactional account number associated with, for example, virtual credit card 101. In exemplary embodiments, limited use transactional account number is further associated with one or more expiration values, such as one or more expiration dates, expiration times, number of transactions, etc. As such, virtual credit card application module 307 determines, per step 1203, based on the one or more expiration values associated with the limited use transaction number, whether the limited use transactional account number has expired. If the limited use transactional account number has not expired, virtual credit card application module 307 continues to monitor use of the limited use transactional account number. However, if the limited use transaction account number has expired, e.g., the expiration date, time, and/or number of transactions has been reached, virtual credit card interface 309, in step 1205, removes the limited use transactional account number from one or more point of sale interfaces, such as conductive strip 821 of virtual credit card 800, bearer tag 105, etc.

The processes described herein for providing virtual credit card services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
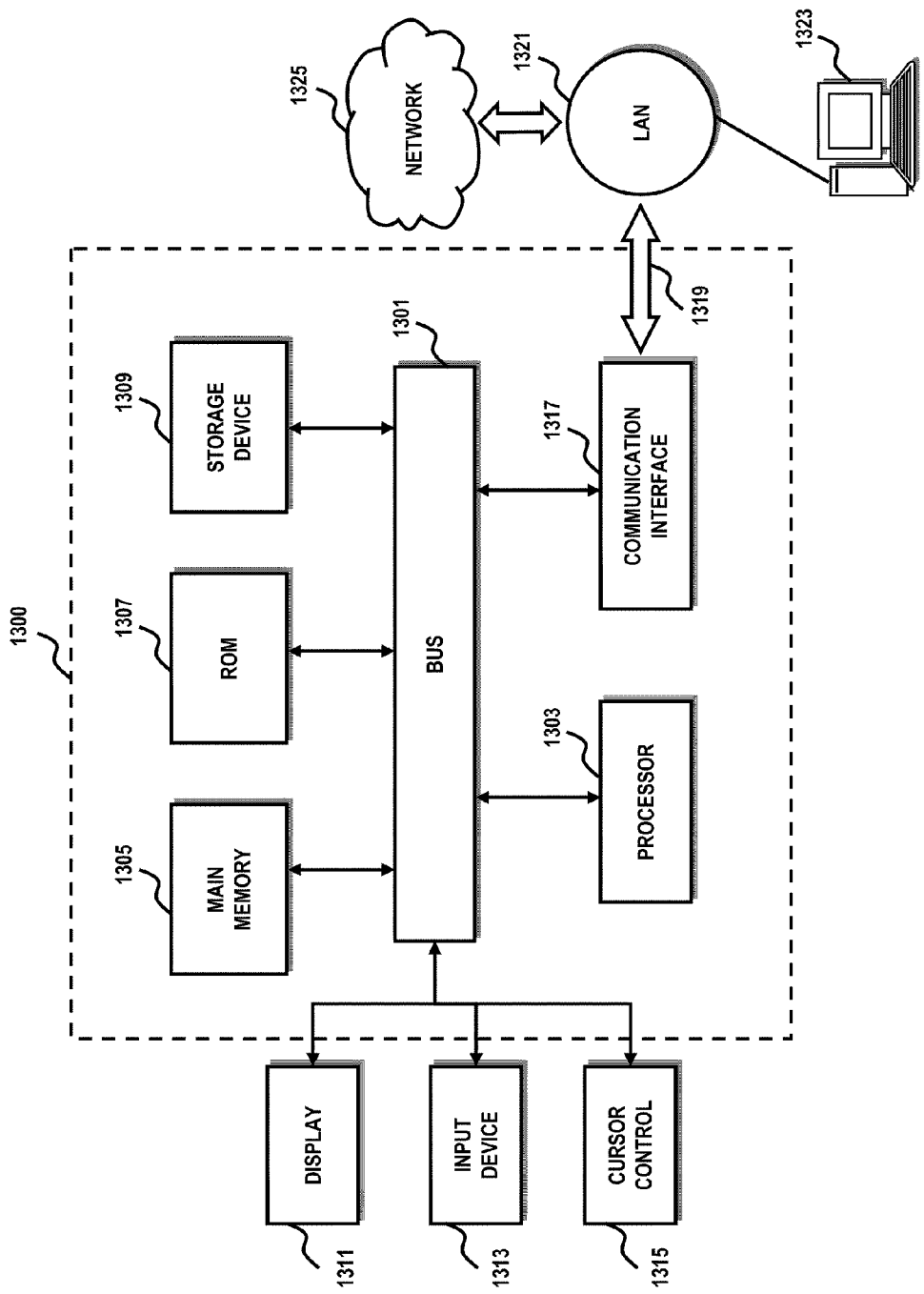
FIG. 13 is a diagram of a computer system that can be used to implement various exemplary embodiments.

FIG. 13 illustrates computing hardware (e.g., computer system) 1300 upon which exemplary embodiments can be implemented. The computer system 1300 includes a bus 1301 or other communication mechanism for communicating information and a processor 1303 coupled to the bus 1301 for processing information. The computer system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions by the processor 1303. The computer system 1300 may further include a read only memory (ROM) 1307 or other static storage device coupled to the bus 1301 for storing static information and instructions for the processor 1303. A storage device 1309, such as a magnetic disk or optical disk, is coupled to the bus 1301 for persistently storing information and instructions.

The computer system 1300 may be coupled via the bus 1301 to a display 1311, such as a cathode ray tube (CRT), liquid crystal display, active matrix display, or plasma display, for displaying information to a computer user. An input device 1313, such as a keyboard including alphanumeric and other keys, is coupled to the bus 1301 for communicating information and command selections to the processor 1303. Another type of user input device is a cursor control 1315, such as a mouse, a trackball, or cursor direction keys, for communicating direction information and command selections to the processor 1303 and for controlling cursor movement on the display 1311.

According to an exemplary embodiment, the processes described herein are performed by the computer system 1300, in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired circuitry may be used in place of or in combination with software instructions to implement exemplary embodiments. Thus, exemplary embodiments are not limited to any specific combination of hardware circuitry and software.

The computer system 1300 also includes a communication interface 1317 coupled to bus 1301. The communication interface 1317 provides a two-way data communication coupling to a network link 1319 connected to a local network 1321. For example, the communication interface 1317 may be a digital subscriber line (DSL) card or modem, an integrated services digital network (ISDN) card, a cable modem, a telephone modem, or any other communication interface to provide a data communication connection to a corresponding type of communication line. As another example, communication interface 1317 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1317 sends and receives electrical, electromagnetic, or optical signals that carry digital data streams representing various types of information. Further, the communication interface 1317 can include peripheral interface devices, such as a Universal Serial Bus (USB) interface, a PCMCIA (Personal Computer Memory Card International Association) interface, etc. Although a single communication interface 1317 is depicted in FIG. 13, multiple communication interfaces can also be employed.

The network link 1319 typically provides data communication through one or more networks to other data devices. For example, the network link 1319 may provide a connection through local network 1321 to a host computer 1323, which has connectivity to a network 1325 (e.g. a wide area network (WAN) or the global packet data communication network now commonly referred to as the "Internet") or to data equipment operated by a service provider. The local network 1321 and the network 1325 both use electrical, electromagnetic, or optical signals to convey information and instructions. The signals through the various networks and the signals on the network link 1319 and through the communication interface 1317, which communicate digital data with the computer system 1300, are exemplary forms of carrier waves bearing the information and instructions.

The computer system 1300 can send messages and receive data, including program code, through the network(s), the network link 1319, and the communication interface 1317. In the Internet example, a server (not shown) might transmit requested code belonging to an application program for implementing an exemplary embodiment through the network 1325, the local network 1321 and the communication interface 1317. The processor 1303 may execute the transmitted code while being received and/or store the code in the storage device 1309, or other non-volatile storage for later execution. In this manner, the computer system 1300 may obtain application code in the form of a carrier wave.

The term "computer-readable medium" as used herein refers to any medium that participates in providing instructions to the processor 1303 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 1309. Volatile media include dynamic memory, such as main memory 1305. Transmission media include coaxial cables, copper wire and fiber optics, including the wires that comprise the bus 1301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method of requesting and receiving a limited use transactional account number at a mobile device comprising:
    presenting a user interface at a display of a mobile device, the mobile device including a global positioning system (GPS) receiver;
    determining via the GPS receiver of the mobile device spatial positioning information corresponding to a location of the mobile device;
    receiving customized input from a user via the user interface, the customized input including at least a request for a limited use transactional account number from one or more credit card issuers within a predefined proximity of the location of the mobile device, and monetary limit for the limited use transactional account number, wherein at the time of the request it is not known to the user what maximum monetary limit for the requested limited use transactional account number is acceptable to any credit card issuer within the predefined proximity of the mobile device;
    determining to receive at the mobile device, in response to the request, based on the spatial positioning information, one or more virtual credit options from the one or more credit card issuers within the predefined proximity of the mobile device, wherein the one or more virtual credit options include terms, conditions, and agreements specified by the one or more credit card issuers that must be accepted before the one or more credit card issuers would be willing to extend credit to the user;
    determining to generate, at the user interface, a selection of a particular credit option from the one or more virtual credit options, wherein the selection includes specific acceptance of the terms, conditions, and agreements specified by the one or more credit card issuers;
    determining to receive at the mobile device, in response to the selection, the limited use transactional account number from the credit card issuer within the predefined proximity that corresponds to the selected particular credit option;
    determining to configure at the display of the mobile device, for presentation at a point of sale terminal, a point of sale interface with the limited use transactional account number; and
    upon condition that the limited use transactional account number of the point of sale interface configured at the mobile device has been reported to the one or more credit card issuers as lost, stolen, or otherwise compromised, determining to receive at the point of sale interface, configured at the display of the mobile device, a false or trick limited use transactional account number from the one or more credit card issuers that, when utilized in association with a subsequent point of sale transaction, is configured to alert one or more authoritative agencies that the false or trick limited use transactional account numbers is being used at the subsequent point of sale transaction.

2. A method according to claim 1, wherein the customized input further includes at least one of expiration date and transaction type.

3. A method according to claim 1, further comprising:
    configuring a display of the mobile device with the limited use transactional account number and at least one or more other virtual credit card values,
    wherein the one or more other virtual credit card values include at least one of an identifier of a credit institution, an identifier of a subscriber, a credit verification value code, and an expiration value.

4. A method according to claim 1, wherein the point of sale interface includes a configurable bearer tag transponder.

5. A method according to claim 4, wherein the customized input further includes at least one of expiration date and transaction type.

6. A method according to claim 1, wherein the limited use transactional account number is a one-time use transactional account number.

7. A method according to claim 6, wherein the customized input further includes transaction type.

8. A method according to claim 1, further comprising:
    removing the limited use transaction account number from the point of sale interface after expiration of at least one of one or more predefined expiration values.

9. A method according to claim 8, wherein the one or more predefined expiration values include at least one of an expiration date and a number of transactions with the limited use transactional account number.

10. A mobile device comprising:
    a display;
    a global positioning system (GPS) receiver receiving GPS information;
    at least one processor; and
    at least one memory including computer program code, the at least one memory and the computer program code being configured, with the at least one processor, to cause the mobile device at least to:
        present a user interface at the display of the mobile device;
        determine spatial positioning information corresponding to a location of the mobile device based on the GPS information received by the GPS receiver;
        receive customized input from a user via the user interface, the customized input including at least a request for a limited use transactional account number from one or more credit card issuers within a predefined proximity of the location of the mobile device, and monetary limit for the limited use transactional account number, wherein at the time of the request it is not known to the user what maximum monetary limit for the requested limited use transactional account number is acceptable to any credit card issuer within the predefined proximity of the mobile device;

determine to receive at the mobile device, in response to the request, based on the spatial positioning information, one or more virtual credit options from the one or more credit card issuers within the predefined proximity of the mobile device, wherein the one or more virtual credit options include terms, conditions, and agreements specified by the one or more credit card issuers that must be accepted before the one or more credit card issuers would be willing to extend credit to the user;

determine to generate, at the user interface, a selection of a particular credit option from the one or more virtual credit options, wherein the selection includes specific acceptance of the terms, conditions, and agreements specified by the one or more credit card issuers;

determine to receive, in response to the selection, the limited use transactional account number from the credit card issuer within the predefined proximity that corresponds to the selected particular credit option;

determine to configure at the display of the mobile device, for presentation at a point of sale terminal, a point of sale interface with the limited use transactional account number; and upon condition that the limited use transactional account number of the point of sale interface configured at the display of the mobile device has been reported to the one or more credit card issuers as lost, stolen, or otherwise compromised, determine to receive at the point of sale interface, configured at the display of the mobile device, a false or trick limited use transactional account number from the one or more credit card issuers that, when utilized in association with a subsequent point of sale transaction, is configured to alert one or more authoritative agencies that the false or trick limited use transactional account numbers is being used at the subsequent point of sale transaction.

11. A mobile device according to claim 10, wherein the customized input further includes at least one of expiration date and transaction type.

12. A mobile device according to claim 10, wherein the apparatus is at least further caused to:
configure a display with the limited use transactional account number and at least one or more other virtual credit card values,
wherein the one or more other virtual credit card values include at least one of an identifier of a credit institution, an identifier of a subscriber, a credit verification value code, and an expiration value.

13. A mobile device according to claim 10, wherein the point of sale interface includes a configurable bearer tag transponder.

14. A mobile device according to claim 13, wherein the customized input further includes at least one of expiration date and transaction type.

15. A mobile device according to claim 10, wherein the limited used transactional account number is a one-time use transactional account number.

16. A mobile device according to claim 10, wherein the apparatus is at least further caused to:
remove the limited use transactional account number from the point of sale interface after expiration of at least one of one or more predefined expiration values.

17. A mobile device according to claim 16, wherein the one or more predefined expiration values include at least one of an expiration date and a number of transactions with the limited use transactional account number.

* * * * *